(12) United States Patent
Wakayama

(10) Patent No.: US 11,347,114 B2
(45) Date of Patent: May 31, 2022

(54) ELECTROOPTICAL DEVICE UTILIZED FOR ELECTRONIC MEMO PAD

(71) Applicant: Japan Display Inc., Tokyo (JP)

(72) Inventor: Yuzo Wakayama, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/333,130

(22) Filed: May 28, 2021

(65) Prior Publication Data

US 2021/0286210 A1   Sep. 16, 2021

Related U.S. Application Data

(63) Continuation of application No. PCT/JP2019/033991, filed on Aug. 29, 2019.

(30) Foreign Application Priority Data

Dec. 4, 2018   (JP) .............................. JP2018-227251

(51) Int. Cl.
| | | |
|---|---|---|
| *G02F 1/1339* | (2006.01) | |
| *G02F 1/1335* | (2006.01) | |
| *G02F 1/1337* | (2006.01) | |

(52) U.S. Cl.
CPC ........ *G02F 1/13394* (2013.01); *G02F 1/1337* (2013.01); *G02F 1/133512* (2013.01)

(58) Field of Classification Search
CPC combination set(s) only.
See application file for complete search history.

(56) References Cited

U.S. PATENT DOCUMENTS

| | | | |
|---|---|---|---|
| 2003/0214623 A1 | 11/2003 | Ebisu et al. | |
| 2007/0262967 A1* | 11/2007 | Rho | ........................ G06F 3/047 |
| | | | 345/173 |
| 2013/0127766 A1 | 5/2013 | Zhao | |
| 2017/0227821 A1* | 8/2017 | Song | ................. G02F 1/136209 |

FOREIGN PATENT DOCUMENTS

| | | |
|---|---|---|
| JP | H11-109367 A | 4/1999 |
| JP | 2001-228975 A | 8/2001 |

OTHER PUBLICATIONS

International Search Report dated Oct. 15, 2019 for the corresponding PCT Application No. PCT/JP2019/033991, with English machine translation.

* cited by examiner

*Primary Examiner* — Lauren Nguyen
(74) *Attorney, Agent, or Firm* — Michael Best & Friedrich LLP

(57) ABSTRACT

An electrooptical device includes a first substrate; a second substrate, a plurality of spacers maintaining a distance between the first substrate and the second substrate; a pixel electrode provided on the first substrate; a conductive layer overlapping a part of the pixel electrode; a protrusion covered with the pixel electrode; a counter electrode opposed to the pixel electrode; a first alignment film provided on the pixel electrode and having a first opening in a portion overlapping the protrusion; a second alignment film provided on the counter electrode and having a second opening in the portion overlapping the protrusion; and a liquid crystal layer provided between the first alignment film and the second alignment film, and a distance from the bottom surface to the top surface in the protrusion is smaller than a distance from the bottom surface to the top surface in the spacer.

18 Claims, 26 Drawing Sheets

ELECTROOPTICAL DEVICE UTILIZED FOR ELECTRONIC MEMO PAD

CROSS REFERENCE TO RELATED APPLICATIONS

This application is based upon and claims the benefit of priority from the prior Japanese Patent Application 2018-227251, filed on Dec. 4, 2018, and the prior International Application PCT/JP2019/033991, filed on Aug. 29, 2019 and the entire contents of which are incorporated herein by reference.

FIELD

An embodiment of the present invention relates to an electrooptical device.

BACKGROUND

A liquid crystal electrooptical device utilizing the electrooptical effect of liquid crystals and an organic electroluminescence electrooptical device using an organic electroluminescent (organic EL) element have been developed and commercialized as an electrooptical device used in electric appliances and electronic equipment.

Electronic memo pads are also starting to become popular as stationery applications. A cholesteric liquid crystal is normally used for an electrooptical device used as electronic memo pads. The electrooptical device has a configuration in which the electrooptical device is normally in alight transmission state, and becomes a light non-transmission state (reflective state) at the location where it is pressed. Japanese Unexamined Patent Publication No. 2001-228975 discloses a liquid crystal electrooptical device for detecting location information when upper and lower substrates are conducting through spherical particles when a liquid crystal electrooptical device is pressed.

SUMMARY

According to an embodiment of the present invention, an electrooptical device includes a first substrate; a second substrate opposed to the first substrate; a plurality of spacers maintaining a distance between the first substrate and the second substrate; a pixel electrode provided on the first substrate; a conductive layer provided on the side of the first substrate in the pixel electrode and overlapping a part of the pixel electrode; a structure (protrusion) provided on the first substrate, the protrusion protruding toward the side of the second substrate, and being covered with the pixel electrode; a counter electrode provided on the second substrate and opposed to the pixel electrode; a first alignment film provided on the pixel electrode and having a first opening in a portion overlapping the protrusion; a second alignment film provided on the counter electrode and having a second opening in the portion overlapping the protrusion; and a liquid crystal layer provided between the first alignment film and the second alignment film, and a distance from the bottom surface to the top surface in the protrusion is smaller than a distance from the bottom surface to the top surface in the spacer.

DESCRIPTION OF EMBODIMENTS

A new electrooptical device that becomes a light transmission state from a normally light non-transmission state when it is pressed is being developed as a method different from the conventional method. When an electrooptical device with this new method is manufactured using the current technique, a display device (also called a touch panel) that combines a touch sensor for detecting a position with a display element, and a driving circuit for moving the display element are required. In this case, manufacturing the touch panel may require many transistors, many wirings, and many insulating layers. As a result, the manufacturing processes of electrooptical devices may increase.

An embodiment according to the present invention provided below discloses an electrooptical device that is easy to manufacture and is capable of switching a display state.

Embodiments of the present invention will be described below with reference to the drawings. The disclosure is merely an example, and those skilled in the art could easily conceive of appropriate changes while maintaining the gist of the invention and such changes are naturally included in the scope of the invention. In addition, although the drawings may be schematically represented with respect to widths, thicknesses, shapes, and the like of the respective portions in comparison with actual embodiments for the sake of clarity of explanation, they are merely an example and do not limit the interpretation of the present invention. In this specification and each of the drawings, the same reference symbols (or reference symbols denoted with A, B, and the like after a numeral) are given to the same elements as those described above with reference to the preceding drawings, and a detailed description thereof may be omitted as appropriate. In addition, the letters "first" and "second" attached to each element are convenient labels used to distinguish each element and have no further meaning unless otherwise stated.

Furthermore, in the detailed description of the present invention, in defining the positional relationship between one component and another, the terms "above" and "below" include not only the case of being positioned directly above or below one component, but also the case of interposing another component therebetween, unless otherwise specified.

In this specification, although "electrode" and "wiring" are used to clearly separate each function, both are a "conductive layer" and have similar meanings.

First Embodiment (1-1. Configuration of Electrooptical Device)

Figure 1:
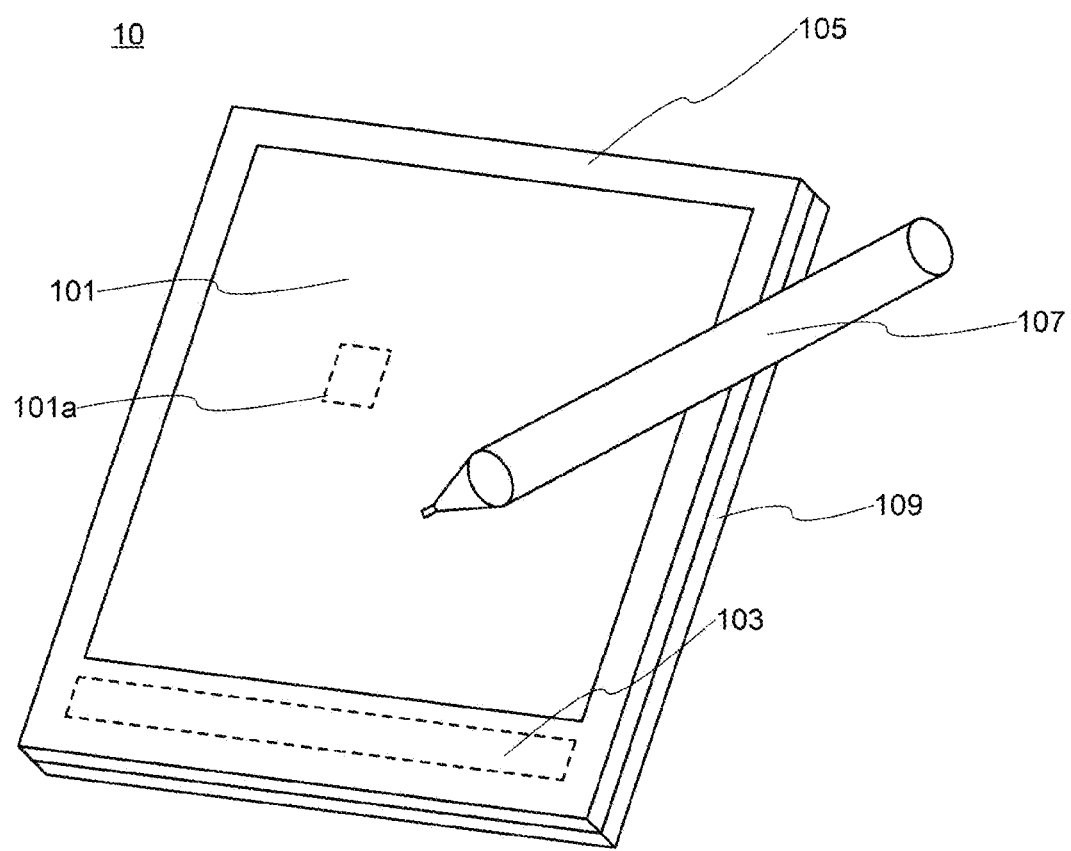
FIG. 1 is a perspective view of an electrooptical device according to an embodiment of the present invention.

FIG. 1 is a perspective view of an electrooptical device 10 according to an embodiment of the present invention. In FIG. 1, the electrooptical device 10 has a display region 101 having pixels, a power supply 103, and a housing 105 that houses the display region 101 and the power supply 103.

The display region 101 is normally in the light non-transmission state. When pressed with a stylus 107 or fingertips, the display region 101 switches to the light transmission state in the pressed region. When the display region 101 is switched to the light transmission state, a display object 109 (paper or display device) arranged on the back side of the display region (a second surface 110b side of a substrate 110, which will be described later) is displayed.

The power supply 103 applies a voltage to a conductive layer 120 and a counter electrode 180, which will be described later, to change the orientation state of the liquid crystal.

(1-2. Configuration of Display Region)

Figure 2:
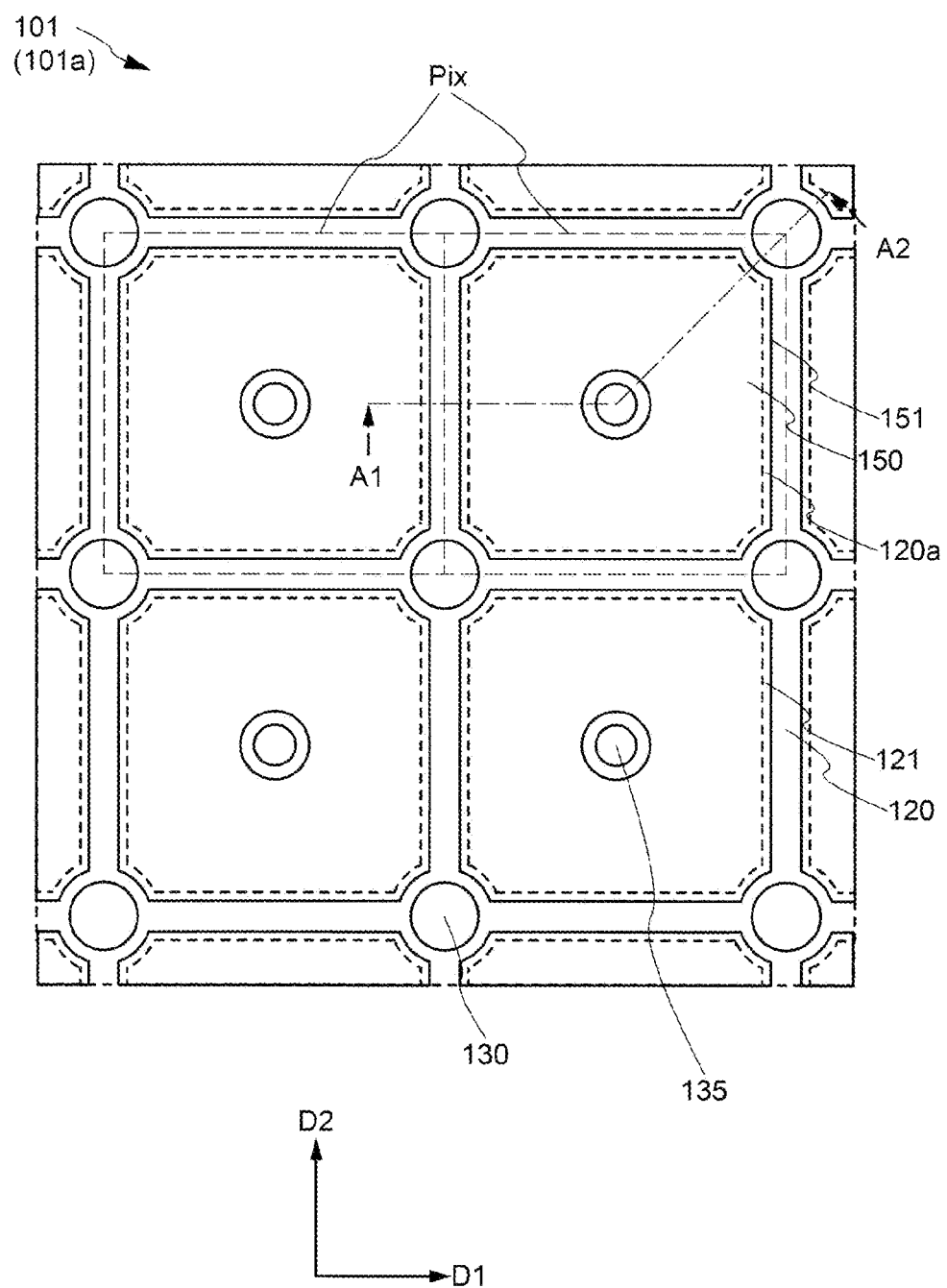
FIG. 2 is a top view showing a part of a display region according to an embodiment of the present invention.

FIG. 2 shows a top view of a part 101a of the display region 101 of FIG. 1. The display region 101 has the conductive layer 120, a spacer 130, a columnar structure 135 (also referred to as a protrusion), and a pixel electrode 150.

As shown in FIG. 2, the conductive layers 120 are arranged in a grid shape in a first direction D1 and a second direction D2 intersecting the first direction D1. In this example, the first direction D1 and the second direction D2 are orthogonal to each other. In this case, a region defined by the conductive layer 120 is defined as a pixel region Pix in the present embodiment. In this example, the pixel region Pix is substantially square, and the pixel region Pix is defined as one pixel.

The spacer 130 is arranged in a grid shape in the first direction D1 and the second direction D2 similar to the conductive layers 120. The spacer 130 is arranged at the corners of the respective pixel regions Pix. In this case, the spacer 130 is arranged overlapping the conductive layer 120.

The columnar structures 135 are arranged on a part of the pixel region Pix respectively. In this example, the columnar structure 135 is arranged at the center of the pixel region Pix. The columnar structure 135 is arranged overlapping the conductive layer 120. The columnar structure 135 is not limited to a columnar shape. The columnar structure 135 may be a truncated cone shape, or may be hemispherical.

The columnar structure 135 is positioned so that the distance between the pixel electrode 150 and the counter electrode 180 is close.

The pixel electrode 150 is arranged in each pixel region Pix. In FIG. 2, an end portion 151 of the pixel electrode 150 is indicated by a solid line, and an end portion 121 of the conductive layer 120 is indicated by a dotted line. As shown in FIG. 2, the pixel electrode 150 overlaps the conductive layer 120 in a part of the pixel region Pix. In this example, the pixel electrode 150 overlaps the conductive layer 120 at the periphery of the pixel region Pix (four sides 120a in this example). Thus, a capacitive element 30 is formed in combination with an insulating layer 140 to be described later.

Figure 3:
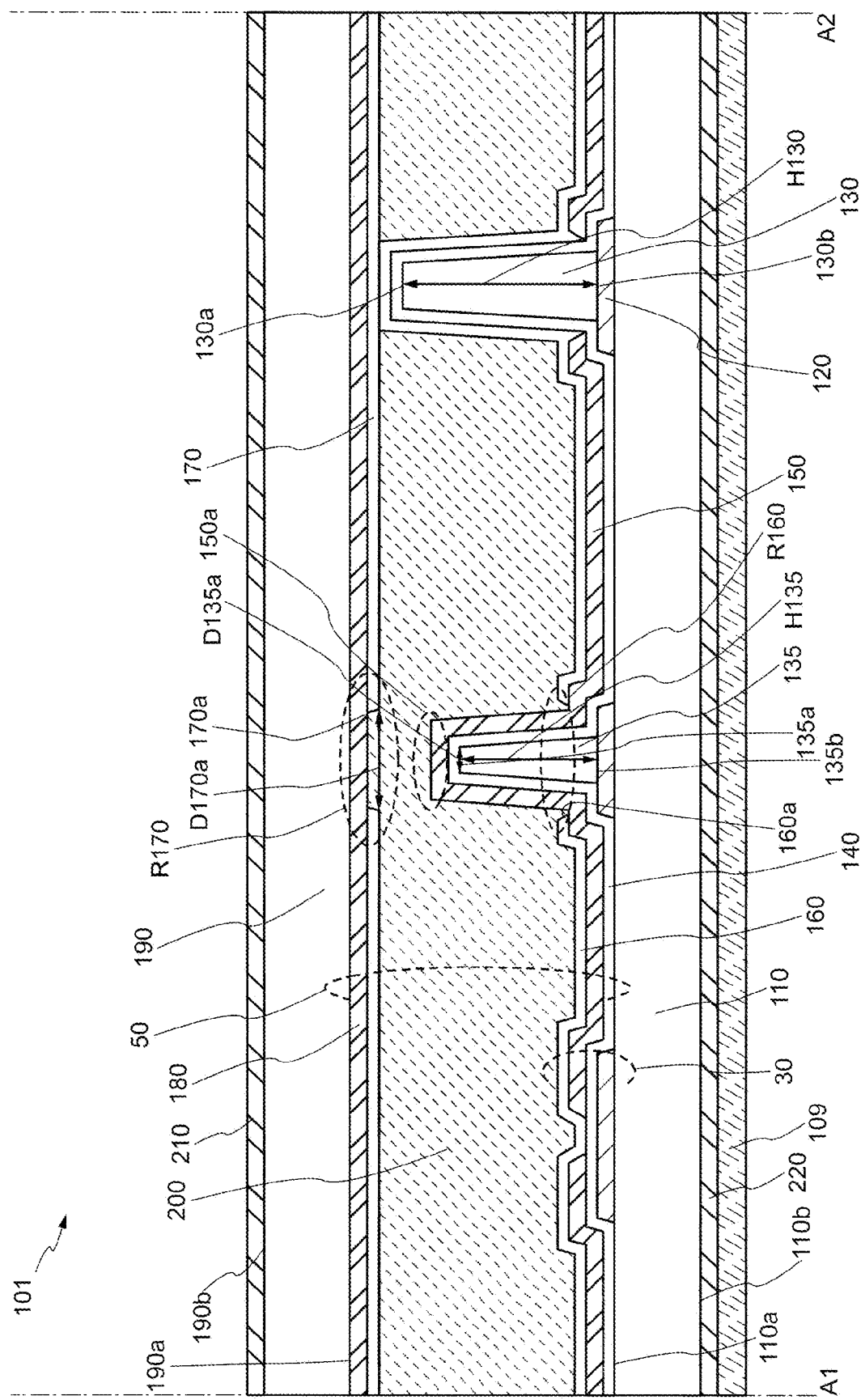
FIG. 3 is a cross-sectional view showing a part of a display region according to an embodiment of the present invention.

FIG. 3 is a cross-sectional view between A1-A2 of the display region 101. As shown in FIG. 3, the display region 101 includes the display object 109, the substrate 110, the insulating layer 140, an alignment film 160, an alignment film 170, the counter electrode 180, a substrate 190, a liquid crystal layer 200, a polarizer 210, and a polarizer 220 as well as the conductive layer 120, the spacer 130, the columnar structure 135, and the pixel electrode 150. In FIG. 3, a portion where the conductive layer 120, the insulating layer 140, and the pixel electrode 150 overlap has a function as the capacitive element 30. The pixel electrode 150, the liquid crystal layer 200, and the counter electrode 180 have a function as a display element (a liquid crystal element 50). Materials used in a known liquid crystal panel can be applied as a liquid crystal material located in the liquid crystal layer 200.

The substrate 110 and the substrate 190 both hold the display region 101 and have light transmittance. A glass substrate or an organic resin material is used for the substrate 110 and the substrate 190. In addition to the above materials, the substrate 110 and the substrate 190 may be formed of an insulating material on their surfaces. The display object 109 is used on the second surface 110b side of the substrate 110. Paper or a display device, or the like may be used as the display object 109. In this case, a second surface 190b of the substrate 190 becomes a display surface. The position where the display object 109 is arranged may be outside the second surface 190b of the substrate 190. In this case, the second surface 110b of the substrate 110 becomes the display surface.

The conductive layer 120 is provided on a first surface 110a of the substrate 110. The conductive layer 120 may be formed of a conductive material having a light-shielding property selected from tantalum, tungsten, titanium, molybdenum, aluminum, or the like. The conductive layer 120 may be a single-layer structure of the aforementioned conductive material or a stacked structure. In this example, a laminated film of molybdenum and aluminum is used as the conductive layer 120.

For example, a base film made of an inorganic insulating film may be arranged between the substrate 110 and the conductive layer 120. As described above, the spacer 130, the columnar structure 135, and the conductive layer 120 are arranged to overlap each other. The liquid crystal layer 200 is not arranged at a location where the spacer 130 is arranged. In other words, the alignment film 160 located on an upper surface of the spacer 130 is in direct contact with the alignment film 170. Since the alignment film 170 is not arranged at a location where the columnar structure 135 is arranged, it is not possible to control the orientation of liquid crystal molecules in the liquid crystal layer 200. Therefore, the conductive layer 120 arranged below the spacer 130 and the columnar structure 135 also has a function as a light-shielding film to prevent the display object 109 arranged on the second surface 110b side of the substrate 110 from being unintentionally displayed. In this case, the conductive layer 120 is provided wider than the spacer 130 and the columnar structure 135 in a portion where the spacer 130, the columnar structure 135, and the conductive layer 120 overlap.

The spacer 130 is provided on the conductive layer 120. The spacer 130 maintains an interval between the substrate 110 and the substrate 190 to a predetermined thickness. An inorganic insulating material or an organic insulating material or a mixed material of an inorganic insulating material and an organic insulating material may be used as the spacer 130. In this example, a polyimide resin is used for the spacer 130.

The columnar structure 135 is provided on the conductive layer 120. The columnar structure 135 protrudes toward the substrate 190. The columnar structure 135 is formed of the same material as the spacer 130. In this example, a polyimide resin is used for the columnar structure 135. In this case, a distance H135 from a lower surface 135b to an upper surface 135a of the columnar structure 135 is preferably smaller than a distance H130 from a lower surface 130b to an upper surface 130a of the spacer 130.

The insulating layer 140 is provided on the substrate 110, the conductive layer 120, the spacer 130, and the columnar structure 135. The insulating layer 140 can be formed of silicon oxide, silicon oxynitride, silicon nitride, or other high dielectric constant inorganic materials. In this case, a silicon nitride film is used for the insulating layer 140.

The pixel electrode 150 is provided on the insulating layer 140. In this case, the pixel electrode 150 is provided so as to cover the side surface and the upper surface of the columnar structure 135. A material having light transmittance is used for the pixel electrode 150. In this example, indium tin oxide (ITO) is used for the pixel electrode 150.

The alignment film 160 is provided on the pixel electrode 150. The alignment film 160 controls the orientation of the liquid crystal molecules in the liquid crystal layer 200. An organic resin or the like is used for the alignment film 160. In this example, an acrylic resin is used for the alignment film 160. The alignment film 160 has an opening 160a in a region R160 overlapping the columnar structure 135 so as not to be arranged on the upper surface 135a of the columnar structure 135.

The alignment film 170 controls the orientation of the liquid crystal molecules in the liquid crystal layer 200, similar to the alignment film 160. The alignment film 170 is formed of the same material as the alignment film 160. The alignment film 170 has an opening 170a in a region R170 that overlaps the columnar structure 135. A width D170a of the opening 170a is wider than a width D135a of the upper surface 135a of the columnar structure 135 (more specifically, the width of the upper surfaces of the insulating layer 140 and the pixel electrode 150 covering the upper surface 135a of the columnar structure 135).

The counter electrode 180 is provided opposite to the pixel electrode 150. The counter electrode 180 has a function as a common electrode of the liquid crystal element 50. The counter electrode 180 has light transmittance. The same material as the pixel electrode 150 is used for the counter electrode 180. In this example, ITO is used for the counter electrode 180.

The liquid crystal layer 200 is between the alignment film 160 and the alignment film 170. An orientation of the liquid crystal molecules in the liquid crystal layer 200 is controlled by the potential difference between the pixel electrode 150 and the counter electrode 180. In this example, a nematic liquid crystal is used for the liquid crystal layer 200, and the liquid crystal element 50 is driven by a TN (Twist Nematic) method. By using the polarizer 210 and the polarizer 220 together with the liquid crystal element 50, it is possible to transmit a specific light.

(1-3. Driving of a Liquid Crystal Element)

Next, driving of the liquid crystal element 50 will be described with reference to FIGS. 4 to 7.

Figure 4:
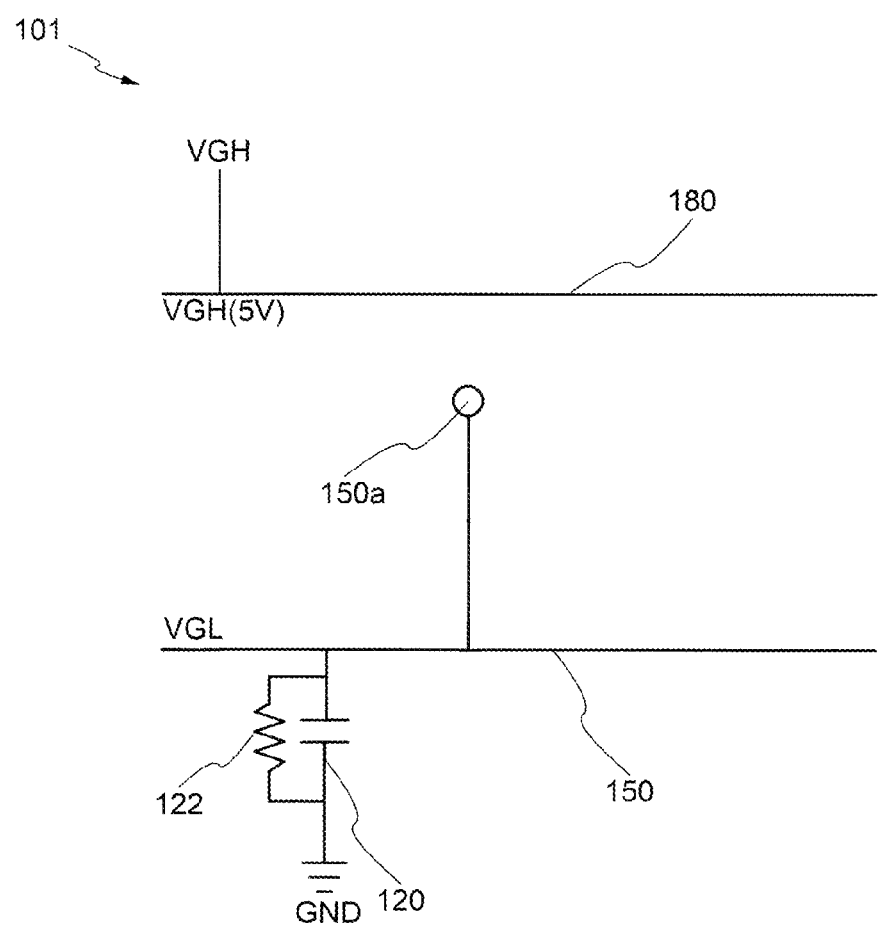
FIG. 4 is a schematic diagram showing a circuit configuration of an electrooptical device according to an embodiment of the present invention.

FIG. 4 is a schematic diagram showing a circuit configuration of the liquid crystal element 50 of the electrooptical device 10. As shown in FIG. 4, a HIGH potential VGH is applied to the counter electrode 180. In this example, 5V is applied to the counter electrode 180. On the other hand, no potential is directly applied to the pixel electrode 150, and the pixel electrode 150 has a floating structure. For example, the potential of GND, that is, 0V is applied to the conductive layer 120. The pixel electrode 150 is capacitively coupled to the conductive layer 120, and the pixel electrode 150 is charged with a potential VGL lower than the counter electrode 180. For example, the pixel electrode 150 is charged with the potential GND or a negative potential. This potential difference creates an electric field in the liquid crystal layer 200, and the liquid crystal molecules in the liquid crystal layer 200 are oriented along the electric field. As a result, the display region 101 is changed to the light non-transmission state. In this case, the pixel electrode 150, the conductive layer 120, and the insulating layer 140 which is a dielectric form the capacitive element 30.

Figure 5:
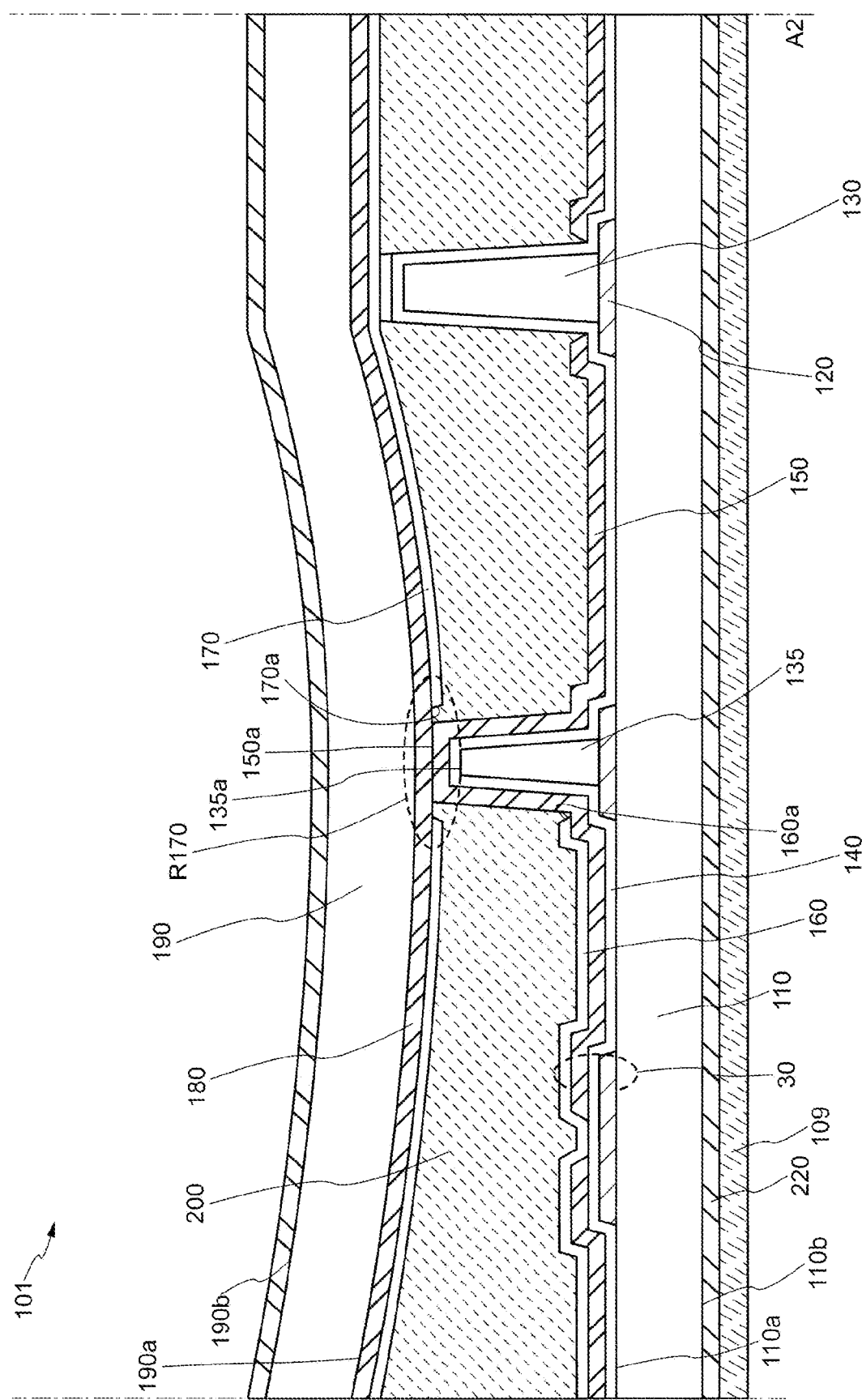
FIG. 5 is a cross-sectional view of a pressed display region when a part of electrooptical device according to an embodiment of the present invention is pressed.

FIG. 5 is a cross-sectional view of the display region 101 when pressing a part of the display region 101. As shown in FIG. 5, pressing a part of the display region 101 causes the substrate 190, the counter electrode 180, and the alignment film 170 to bend. In this case, as described above, the opening 170a is arranged in the alignment film 170. As a result, a portion 150a of the pixel electrode 150 covering the upper surface 135a of the columnar structure 135 is electrically connected to the counter electrode 180. If the pixel electrode 150 (150a) and the counter electrode 180 are electrically connected, the opening 160a and the opening 170a may not be provided.

Figure 6:
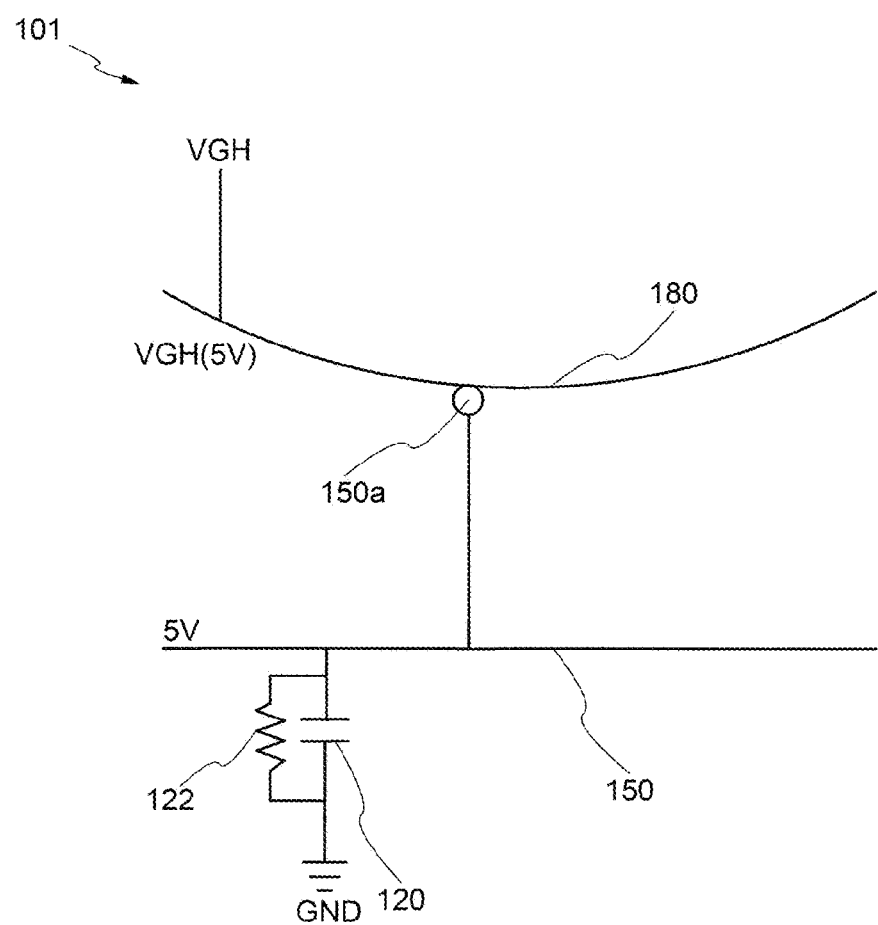
FIG. 6 is a schematic diagram showing a circuit configuration of an electrooptical device according to an embodiment of the present invention.

FIG. 6 is a schematic diagram showing a circuit configuration of the liquid crystal element 50 of the electrooptical device 10 when pressing a part of the display region 101. As shown in FIG. 6, by connecting the portion 150a of the pixel electrode 150 to the counter electrode 180, the HIGH potential VGH applied to the counter electrode 180 is also applied to the pixel electrode 150. Specifically, a potential of 5V is applied to the pixel electrode 150. As a result, since no electric field is generated with respect to the liquid crystal layer 200, the orientation state of the liquid crystal molecules changes from the orientation state in FIG. 3. As a result, the orientation state is changed to the light transmission state in a part of the display region 101, in other words, in a region where the pixel electrode 150 electrically connected to the counter electrode 180 is located.

Figure 7:
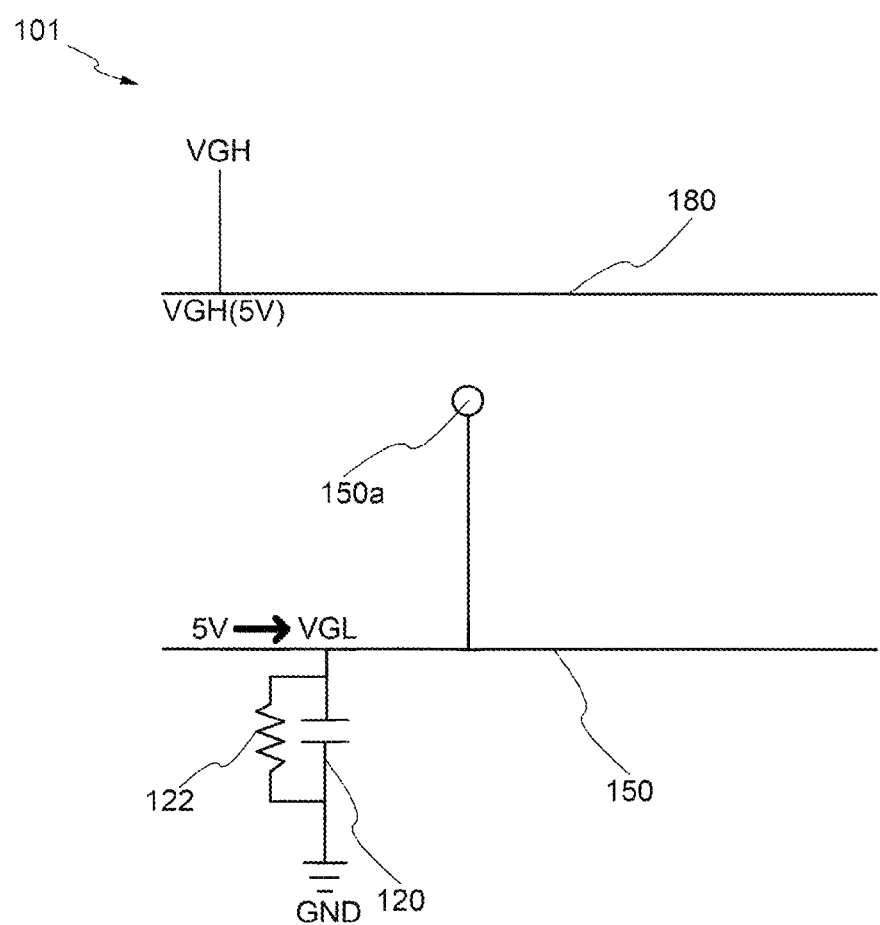
FIG. 7 is a schematic diagram showing a circuit configuration of an electrooptical device according to an embodiment of the present invention.

FIG. 7 is a schematic diagram showing a circuit configuration of the liquid crystal element 50 of the electrooptical device 10 after the pressing is released. As shown in FIG. 7, when the portion 150a of the pixel electrode 150 is separated from the counter electrode 180, a potential difference between the potential VGH (5V) stored in the pixel electrode 150 and the potential GND (0V) applied to the conductive layer 120 occurs in the capacitive element 30. In this case, the leak current caused by an insulating resistance 122 of the capacitive element 30 flows gradually from the pixel electrode 150 to the conductive layer 120. Thus, the potential of the pixel electrode 150 gradually decreases from 5V, and as a result, the potential of the pixel electrode 150 again becomes the potential VGL. Thereafter, an electric field is generated with respect to the liquid crystal layer 200 in the same manner as in FIG. 4, and the liquid crystal layer 200 is oriented again along the electric field. That is, it is possible to gradually change from the light transmission state to the light non-transmission state.

The time until the liquid crystal is oriented again can be appropriately adjusted by a time constant calculated based on the insulating resistance of the capacitance value and dielectric (the insulating layer 140) in the capacitive element 30 including the conductive layer 120, the insulating layer 140, and the pixel electrode 150. By using the above method, in the display region 101, it is possible to control the light transmission state and the light non-transmission state for each pixel region Pix (pixel). In other words, the display state can be controlled without the specific use of a driving circuit.

(1-4. Manufacturing Method of an Electrooptical Device)

Hereinafter, a manufacturing method of the electrooptical device 10 will be described with reference to FIGS. 8 to 13.

Figure 8:
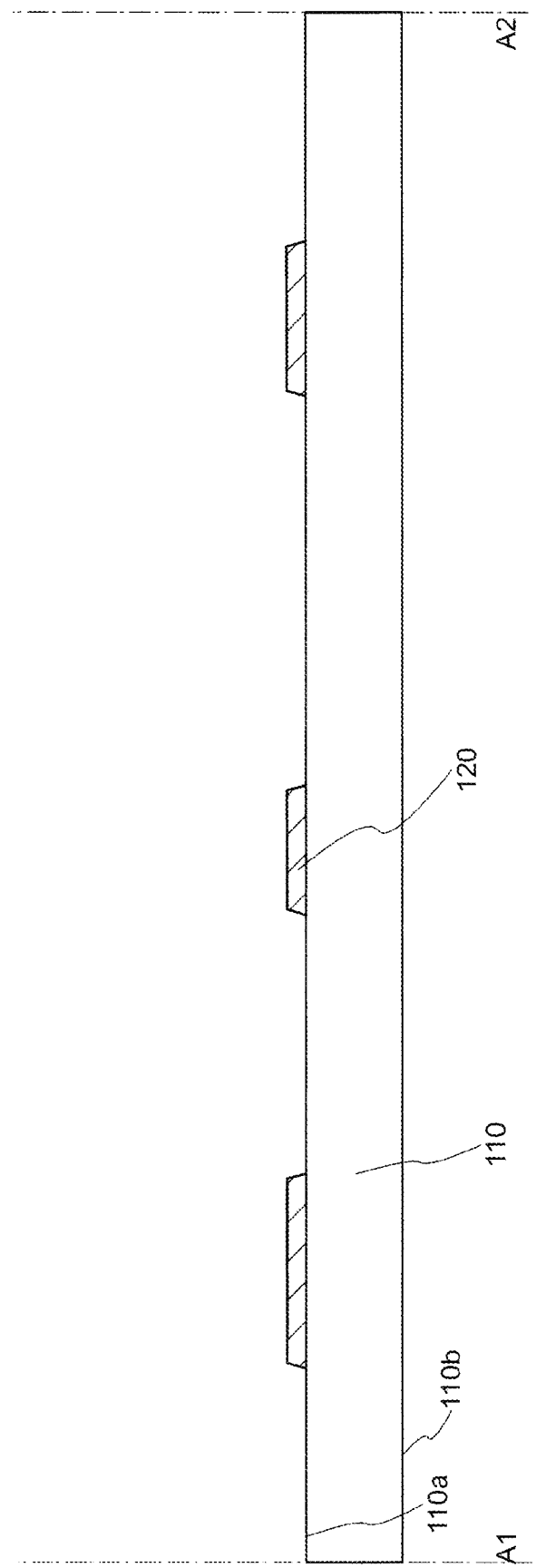
FIG. 8 is a cross-sectional view illustrating a manufacturing method of an electrooptical device according to an embodiment of the present invention.

First, as shown in FIG. 8, the conductive layer 120 is formed on a substrate 100. A material having an insulating property and light transmittance is used for the substrate 100 for providing the display object 109 on the second surface 110b side. Specifically, the substrate 110 may be formed of an inorganic insulating material, an organic resin material, or a conductive material that has been subjected to an insulating treatment. More specifically, examples thereof include a glass substrate such as a quartz substrate, an alkali-free glass substrate, and a soda glass, an inorganic insulating substrate such as sapphire and alumina, and an acrylic resin, an epoxy resin, a polyimide resin, and a polyethylene terephthalate resin and the like are used for the substrate 110. For example, when an organic resin substrate is used for the substrate 100, a polyimide substrate may be used. The organic resin substrate can have a thickness of several micrometers to several tens of micrometers. As a result, a sheet display having flexibility can be realized. Prior to forming the conductive layer 120, for example, the base film of an inorganic insulating material may be formed on the substrate 100. For example, the base film is formed on the entire surface of the first surface 110a.

The conductive layer 120 may be formed of a material such as a metal element selected from tungsten, aluminum, chromium, copper, titanium, tantalum, molybdenum, nickel, cobalt, tungsten, indium, tin, and zinc, an alloy containing any of these metal elements as a component, or an alloy containing any of these metal elements in combination. Nitrogen, oxygen, hydrogen, or the like contained in the above materials may be used as the conductive layer 120. The conductive layer 120 may be a single layer film or a stacked film. The conductive layer 120 is formed by a sputtering method, a CVD method, a plating method, and a printing method or the like. For example, a molybdenum-aluminum stacked film formed by a sputtering method can be used as the conductive layer 120. The conductive layer 120 is processed into a predetermined shape by a photolithography method and an etching method.

Figure 9:
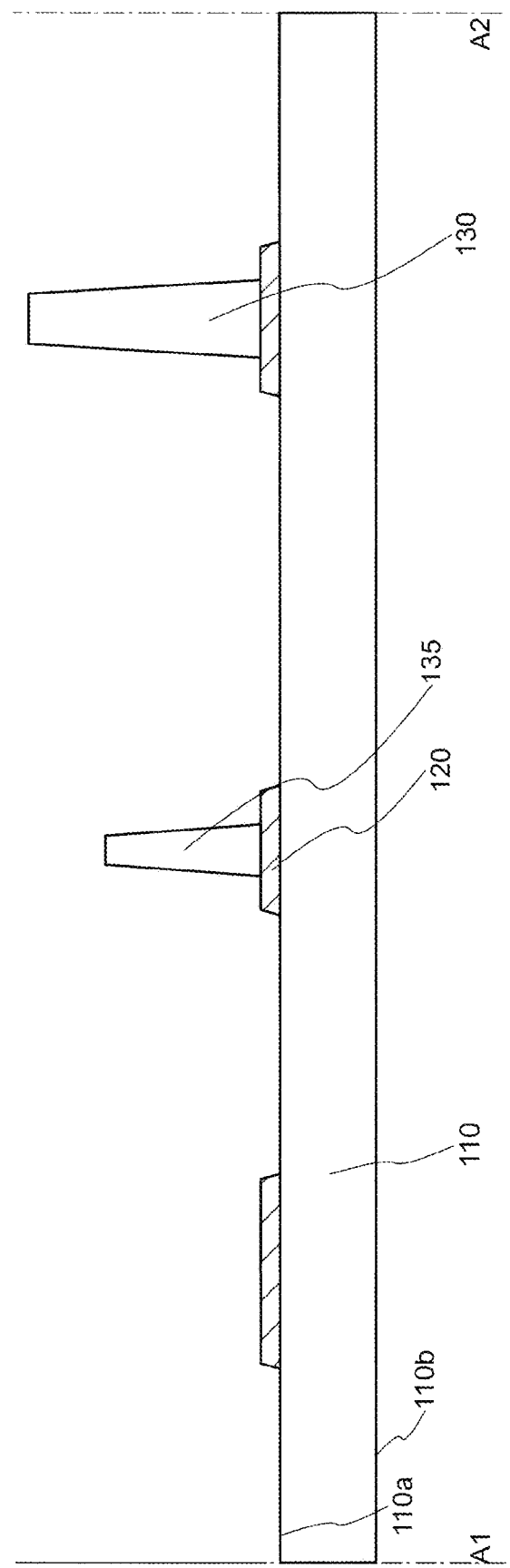
FIG. 9 is a cross-sectional view illustrating a manufacturing method of an electrooptical device according to an embodiment of the present invention.

Next, as shown in FIG. 9, the spacer 130 and the columnar structure 135 are formed on the substrate 110 and the conductive layer 120. The spacer 130 and the columnar structure 135 are formed of an organic resin material such as an acrylic resin, an epoxy resin, and a polyimide resin. The spacer 130 and the columnar structure 135 are processed by a photolithography method and an etching method. When a polyimide resin having a photosensitive material is used as the spacer 130 and the columnar structure 135, they can be processed only by a photolithography method. In this case, when a positive photosensitive material is used, it is preferable to use a light-shielding film for a portion corresponding to the spacer 130, and to use a half-tone mask for a portion corresponding to the columnar structure 135. By using the half-tone mask, the height of the columnar structure 135 can be made different from the height of the spacer 130. The processed spacer 130 and the columnar structure 135 may be cured by heat treatment as appropriate.

Figure 10:
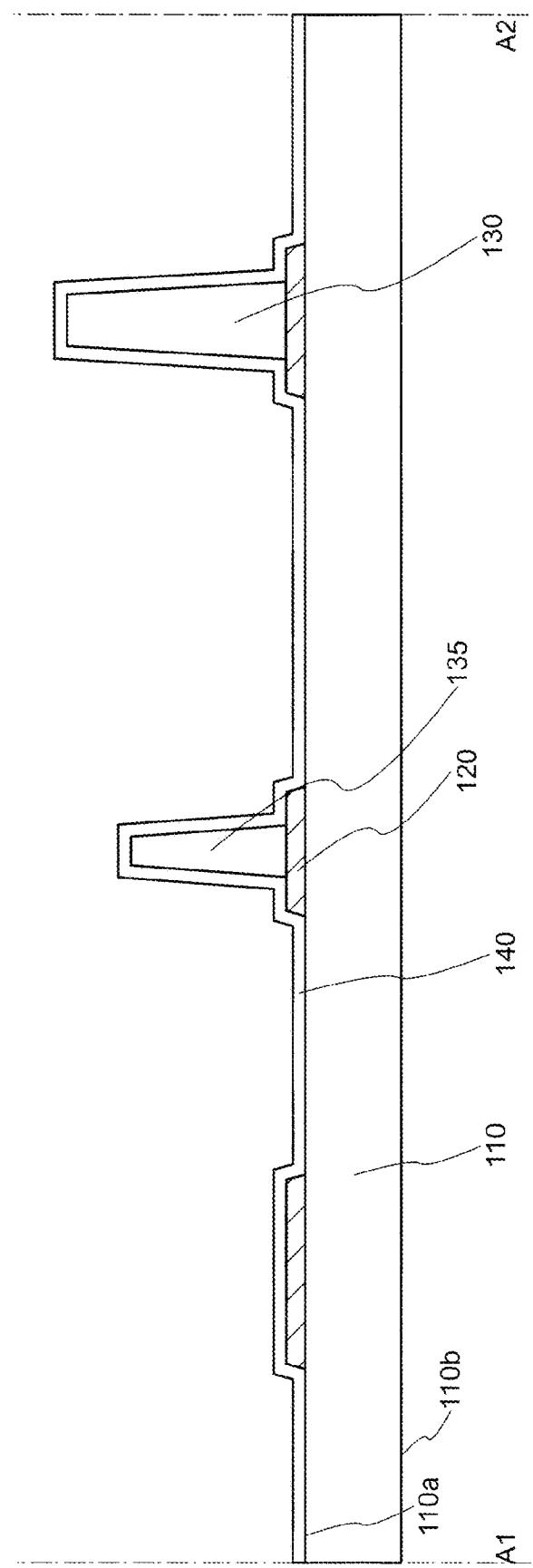
FIG. 10 is a cross-sectional view illustrating a manufacturing method of an electrooptical device according to an embodiment of the present invention.

Next, as shown in FIG. 10, the insulating layer 140 is formed on the substrate 110, the conductive layer 120, the spacer 130 and the columnar structure 135. The insulating layer 140 is formed of a material such as silicon oxide, silicon oxynitride, silicon nitride, or the like. The insulating layer 140 may be a single layer or a stacked layer. The insulating layer 140 may be formed by a thermal CVD (Chemical Vapor Deposition) method, a plasma CVD method, a spin-coating method, a printing method, or the like. In this example, a silicon nitride film formed by a plasma CVD method is used.

Figure 11:
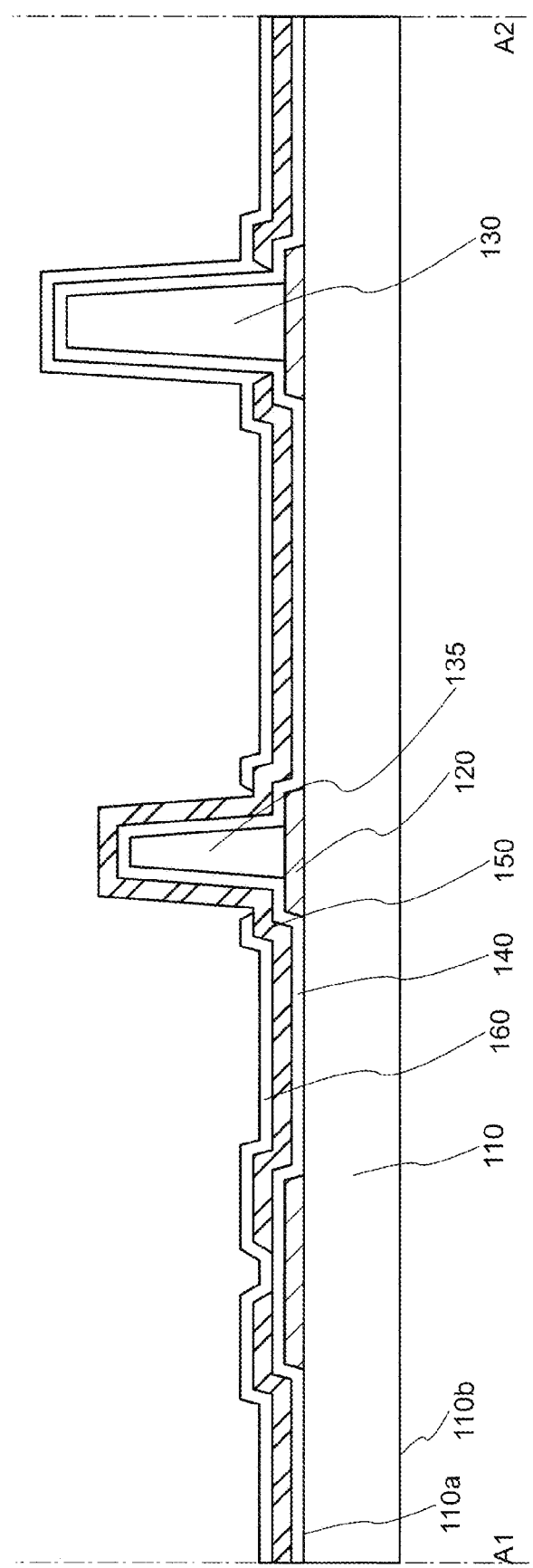
FIG. 11 is a cross-sectional view illustrating a manufacturing method of an electrooptical device according to an embodiment of the present invention.

Next, as shown in FIG. 11, the pixel electrode 150 and the alignment film 160 are formed. A light transmission conductive film such as an ITO (indium tin oxide) or an IZO (indium zinc oxide) is used for the pixel electrode 150. For example, the film thickness of the pixel electrode 150 may be appropriately set to 100 nm or more and 1 μm or less. The pixel electrode 150 may be formed by a vacuum vapor deposition method, a sputtering method, or the like. For example, an ITO film formed by a sputtering method can be used as the pixel electrode 150. The pixel electrode 150 may be removed by a photolithography method and an etching method in a portion overlapping the spacer 130.

An organic resin material such as an acrylic resin, a polyimide resin, or an epoxy resin is used for the alignment film 160. The alignment film 160 can be formed to a thickness of several hundred nanometers or more and several micrometers or less by a coating method, a vapor deposition method, a spraying method, an ink-jet method, a printing method, or the like. In order to enhance the orientation of the liquid crystal layer 200, the alignment film 160 may be subjected to a rubbing treatment. In this example, a polyimide resin formed by a coating method is used.

The alignment film 160 is removed by a photolithography method and an etching method in a portion that overlaps the columnar structure 135. This allows the pixel electrode 150 on the columnar structure 135 to be exposed.

Figure 12:
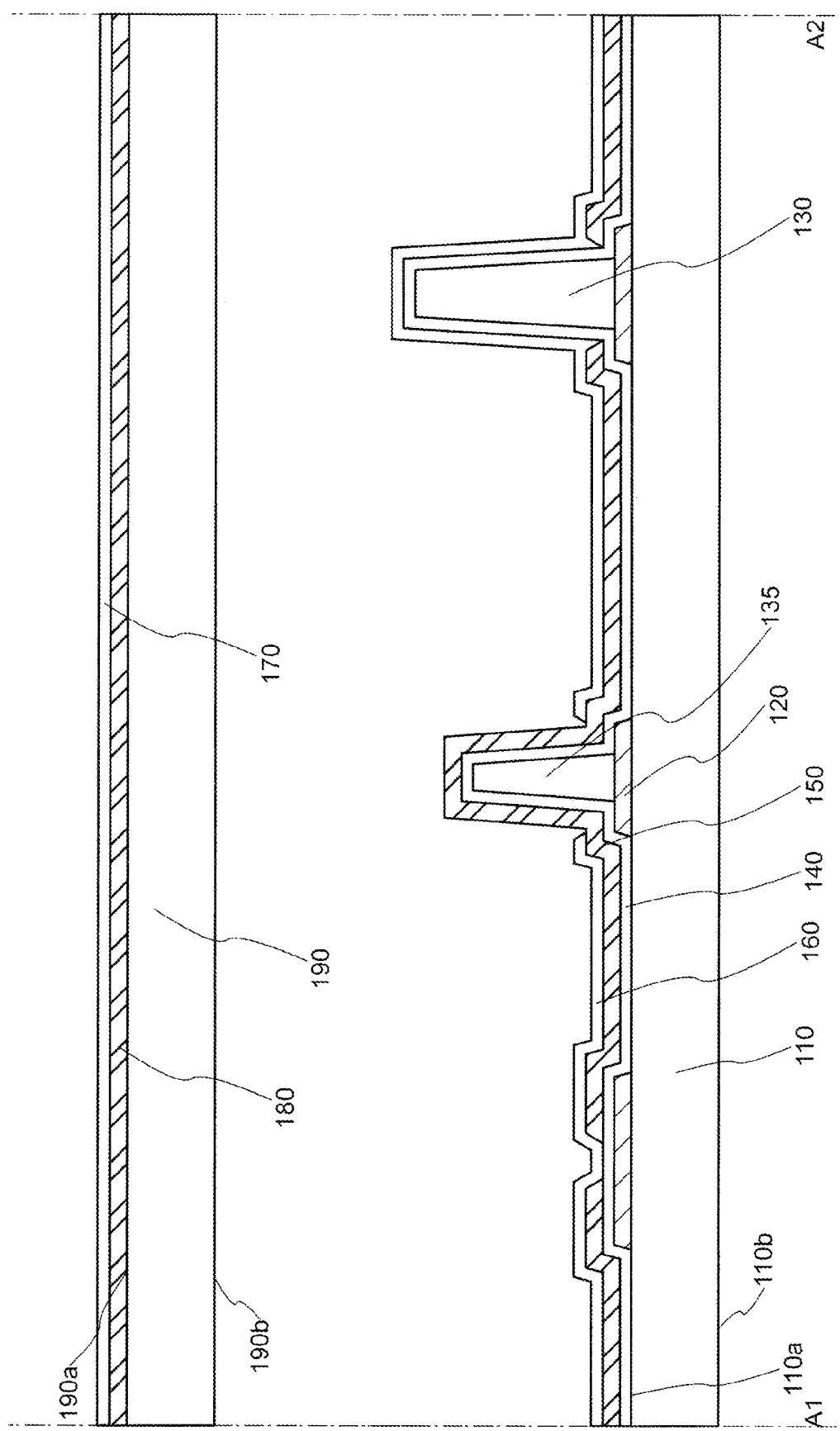
FIG. 12 is a cross-sectional view illustrating a manufacturing method of an electrooptical device according to an embodiment of the present invention.

Next, as shown in FIG. 12, the counter electrode 180 and the alignment film 170 are formed on a first surface 190a of the substrate 190. The counter electrode 180 is formed by the same material and method as the pixel electrode 150. For example, the ITO film formed by a sputtering method can be used as the counter electrode 180.

The alignment film 170 is formed by the same material and method as the alignment film 160. In order to enhance the orientation of the liquid crystal layer 200, the alignment film 170 is subjected to a rubbing treatment.

Figure 13:
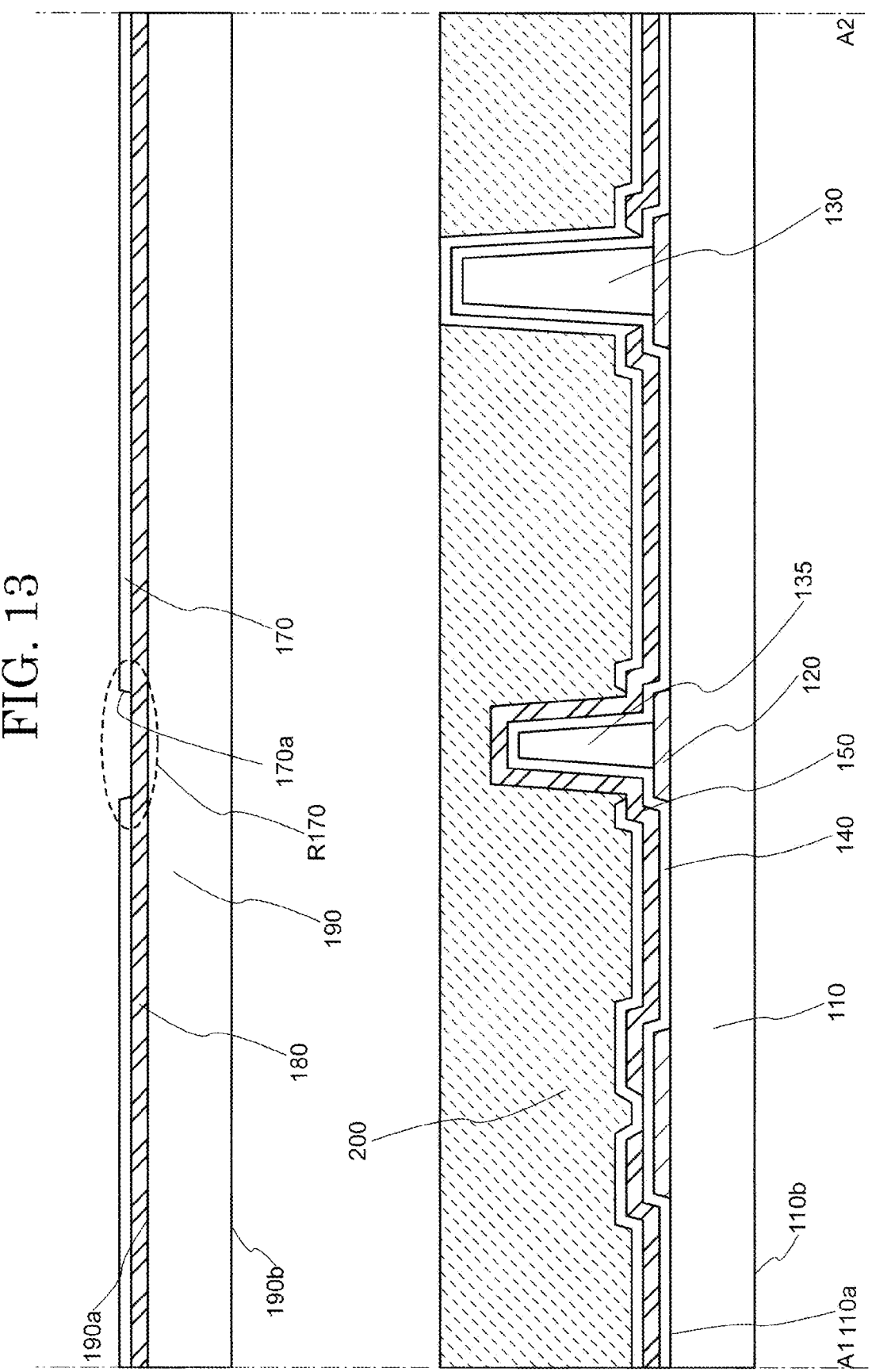
FIG. 13 is a cross-sectional view illustrating a manufacturing method of an electrooptical device according to an embodiment of the present invention.

Next, as shown in FIG. 13, the opening 170a is formed on the alignment film 170. The opening 170a is formed in the region R170 that overlaps the columnar structure 135. The opening 170a is formed by a photolithography method and an etching method. When the alignment film 170 is formed of a photosensitive material, the opening 170a can be formed only by a photolithography method.

Next, an adhesive (not shown) is formed on a peripheral region of the substrate 110. For example, a photo-curing adhesive is used for the adhesive. The photo-curing adhesive is cured by ultraviolet rays, electron rays, visible light, infrared rays, or the like. Specifically, the adhesive includes an epoxy resin, an acrylic resin, a silicone resin, a phenolic resin, a polyimide resin, an imide resin, a PVC (polyvinylchloride) resin, a PVB (polyvinylbutyral) resin, an EVA (ethylene vinyl acetate) resin, silica, or the like.

Next, the liquid crystal layer 200 is formed inside a region surrounded by the adhesive. The liquid crystal layer 200 is formed by an ODF (One Drop Fill) method or the like. In this example, a nematic liquid crystal is used for the liquid crystal layer 200. The liquid crystal layer 200 is not limited to this method. The liquid crystal layer 200 may be injected by an appropriate method.

Next, the substrate 100 and the substrate 190 serving as a counter substrate are bonded to each other using the adhesive. After bonding the substrate 110 and the substrate 190, ultraviolet rays may be irradiated on an adhesive layer to cure the adhesive layer. Finally, the polarizer 210 is arranged on the second surface 190b of the substrate 190, the polarizer 220 and the display object 109 are arranged on the second surface 110b of the substrate 110 and both are accommodated in the housing 105. Thus, the electrooptical device 10 is manufactured. The display object 109 may be removable from the electrooptical device 10. The display object 109 may not be accommodated in the housing 105.

By using the above manufacturing method, an electrooptical device can be manufactured without forming a transistor or the like used for a driving circuit. Therefore, it is possible to suppress the process load to manufacture an electrooptical device.

Second Embodiment

In this embodiment, an electrooptical device having an opening in a part of the insulating layer 140 will be described.

Figure 14:
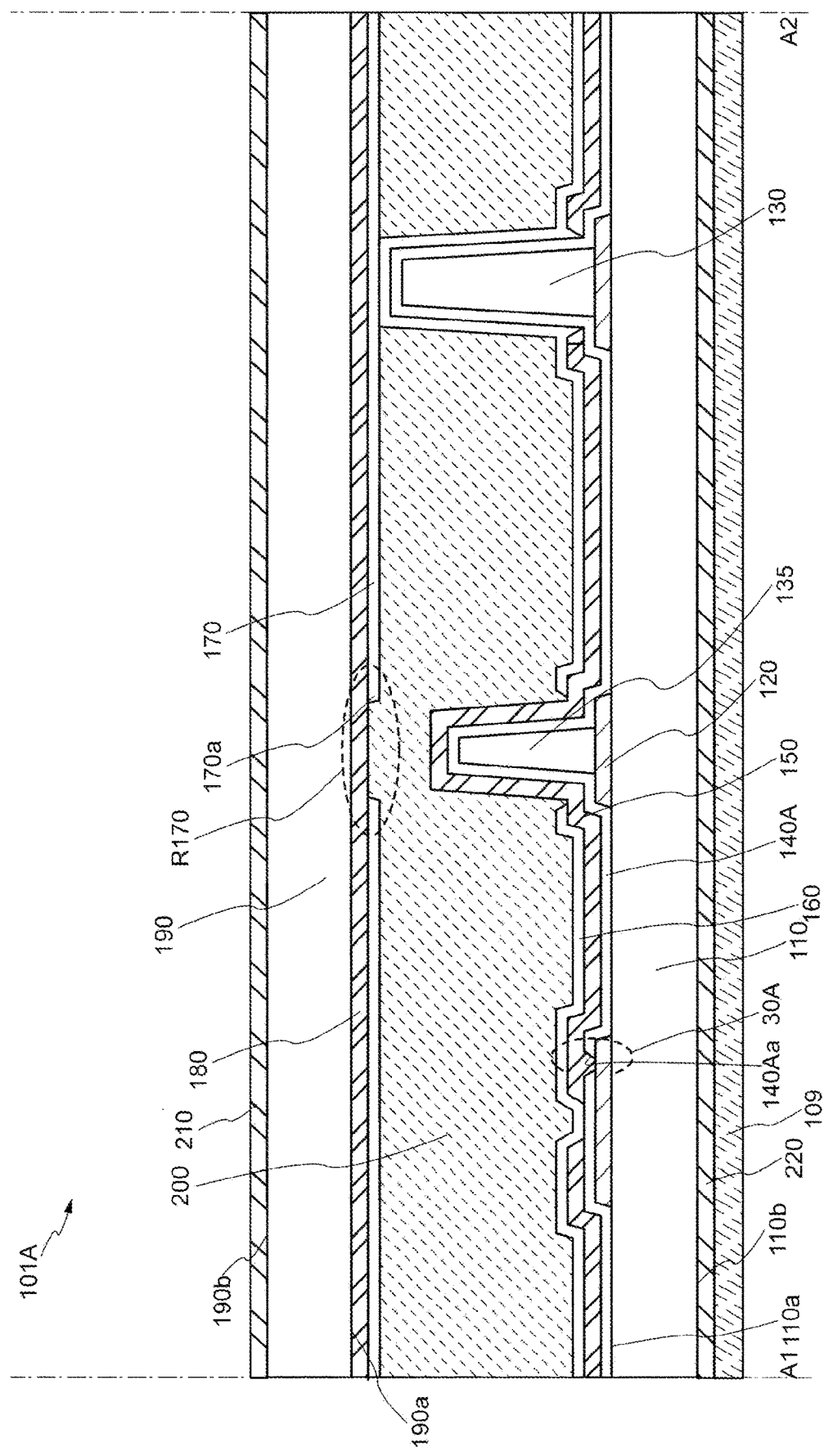
FIG. 14 is a cross-sectional view showing a part of a display region according to an embodiment of the present invention.

FIG. 14 is a cross-sectional view showing a part of a display region 101A. As shown in FIG. 14, the display region 101A includes the substrate 110, the conductive layer 120, the spacer 130, the columnar structure 135, an insulating layer 140A, the pixel electrode 150, the alignment film 160, the alignment film 170, the counter electrode 180, the substrate 190, and the liquid crystal layer 200.

The insulating layer 140A is formed of the same material as the insulating layer 140 of the first embodiment. However, the insulating layer 140A has an opening 140Aa on the conductive layer 120 of a capacitive element 30A. The width of the opening 140Aa is preferably 2 μm or more and 20 μm or less.

By using the present embodiment, in addition to charge transfer due to the capacitive coupling between the conductive layer 120 and the pixel electrode 150 in the capacitive element 30A, a small amount of charge transfer occurs by electrically connecting the conductive layer 120 and the pixel electrode 150 in the opening 140Aa. This makes it possible to control the light transmission state and light non-transmission state of the electrooptical device with higher accuracy. An area of the opening 140Aa is preferably less than 5% with respect to an area of the top surface in the conductive layer 120. This is because the potential of the pixel electrode 150 can be gradually changed from the potential VGH to the potential VGL when the pressing is released and the conduction between the pixel electrode 150 and the counter electrode 180 is eliminated.

In the present embodiment, although an example in which the opening 140Aa is provided in the insulating layer 140A is shown, the present invention is not limited thereto. For example, when the thickness of the insulating layer 140A is reduced to 300 nm or less, the possibility that the insulating layer 140A has minute defects increases. This results in the transfer of charges from the pixel electrode 150 to the conductive layer 120 via the minute defects, and the light transmission state and light non-transmission state of the electrooptical device can be controlled.

Third Embodiment

In the present embodiment, an electrooptical device having a semiconductor layer in a part of the insulating layer 140 will be described.

Figure 15:
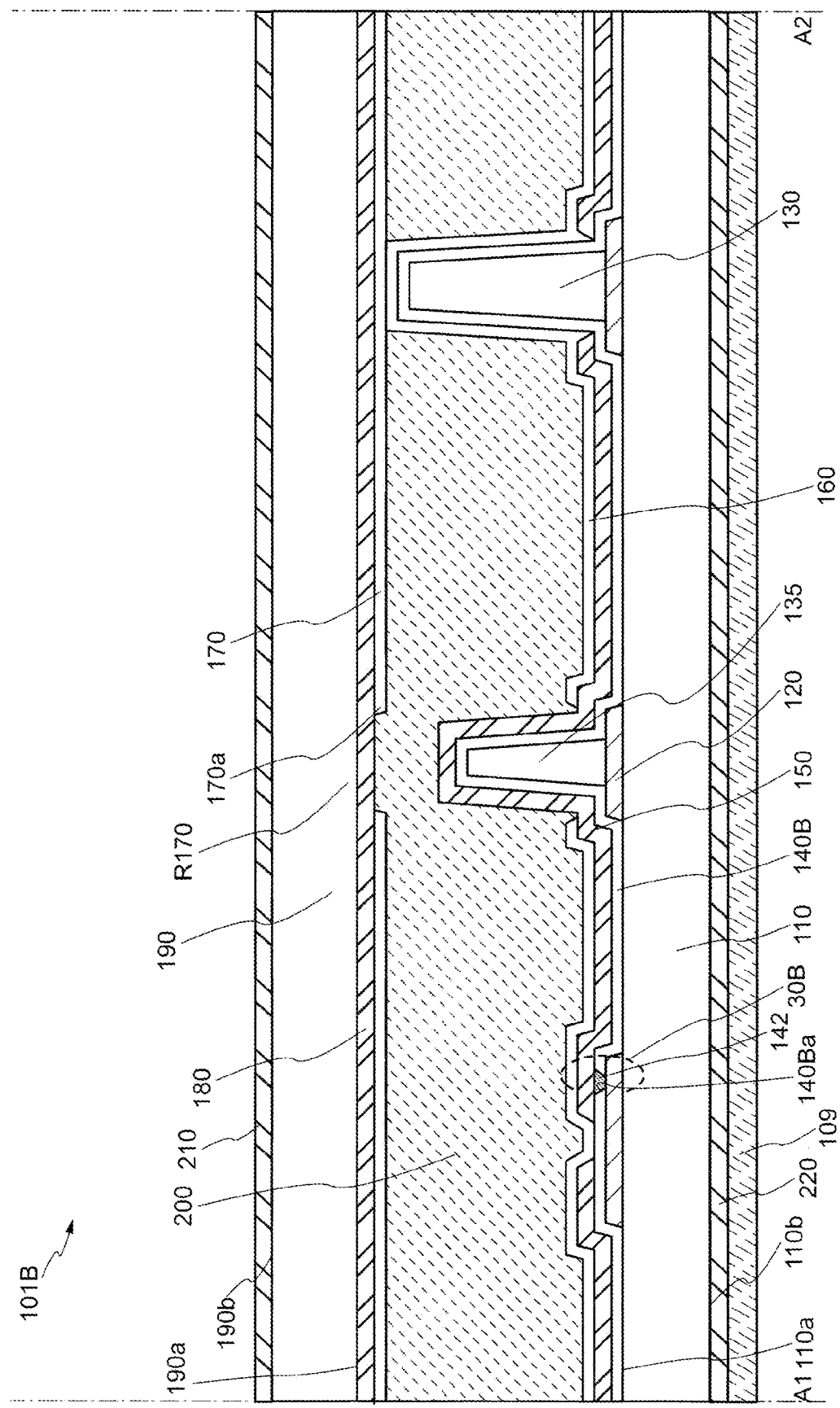
FIG. 15 is a cross-sectional view showing a part of a display region according to an embodiment of the present invention.

FIG. 15 is a cross-sectional view showing a part of a display region 101B. As shown in FIG. 15, the display region 101B includes the substrate 110, an insulating layer 140B, a semiconductor layer 142, the pixel electrode 150, the alignment film 160, the alignment film 170, the counter electrode 180, the substrate 190, and the liquid crystal layer 200 in addition to the conductive layer 120, the spacer 130, and the columnar structure 135.

The insulating layer 140B is formed of the same material as the insulating layer 140 of the first embodiment. However, the insulating layer 140B has an opening 140Ba on the conductive layer 120 of a capacitive element 30B. The width of the opening 140Ba is preferably 2 μm or more and 20 μm or less.

The semiconductor layer 142 is provided in the opening 140Ba. A semiconductor material is used for the semiconductor layer 142. When the semiconductor layer 142 is formed of a silicon material, for example, amorphous silicon, polycrystalline silicon, or the like may be used. When an oxide semiconductor is used for the semiconductor layer 142, a metal material such as indium, gallium, zinc, titanium, aluminum, tin, and cerium can be used. For example, an oxide semiconductor (IGZO) containing indium, gallium, or zinc can be used. The semiconductor layer 142 can be formed by a sputtering method, a vapor deposition method, a plating method, a CVD method, or the like.

By using the present embodiment, in addition to the transfer of charges due to the capacitive coupling between the conductive layer 120 and the pixel electrode 150 in the capacitive element 30B, a small amount of charge transfer occurs through the semiconductor layer 142. This makes it possible to control the light transmission state and light non-transmission state of the electrooptical device with higher accuracy.

Fourth Embodiment

In the present embodiment, an electrooptical device having a semiconductor layer and a doping layer instead of the insulating layer 140 will be described.

Figure 16:
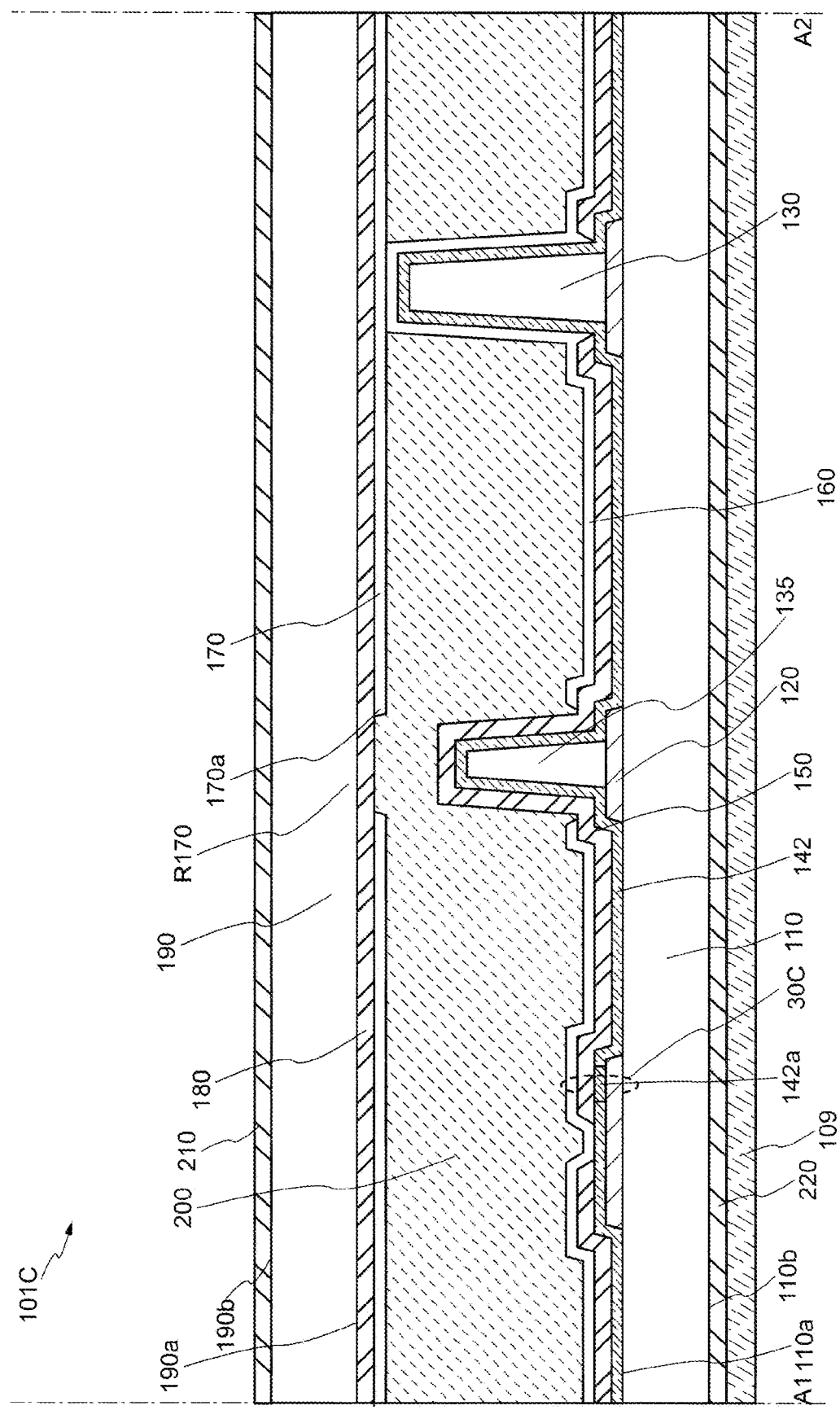
FIG. 16 is a cross-sectional view showing a part of a display region according to an embodiment of the present invention.

FIG. 16 is a cross-sectional view showing a part of a display region 101C. As shown in FIG. 16, the display region 101C includes the semiconductor layer 142 in addition to the substrate 110, the conductive layer 120, the spacer 130, the columnar structure 135, the pixel electrode 150, the alignment film 160, the alignment film 170, the counter electrode 180, the substrate 190, and the liquid crystal layer 200.

In the present embodiment, the semiconductor layer 142 is provided instead of the insulating layer 140. The semiconductor layer 142 is formed of the same material as the semiconductor layer 142 described in the second embodiment. The semiconductor layer 142 has a doping region 142a in a portion of a capacitive element 30C that overlaps the conductive layer 120. The doping region 142a has higher conductivity than the other regions of the semiconductor layer 142. Examples of the material to be doped include phosphorus, boron, and arsenic. The width of the doping region 142a is preferably 5 μm or more and 50 μm or less.

By using the present embodiment, in addition to the transfer of charges due to the capacitive coupling between the conductive layer 120 and the pixel electrode 150 in the capacitive element 30C, a small amount of charge transfer occurs through the doping region 142a. This makes it possible to control the light transmission and light non-transmission of the electrooptical device with higher accuracy.

Fifth Embodiment

In the present embodiment, an electrooptical device in which the columnar structure 135 has a different arrangement will be described.

Figure 17:
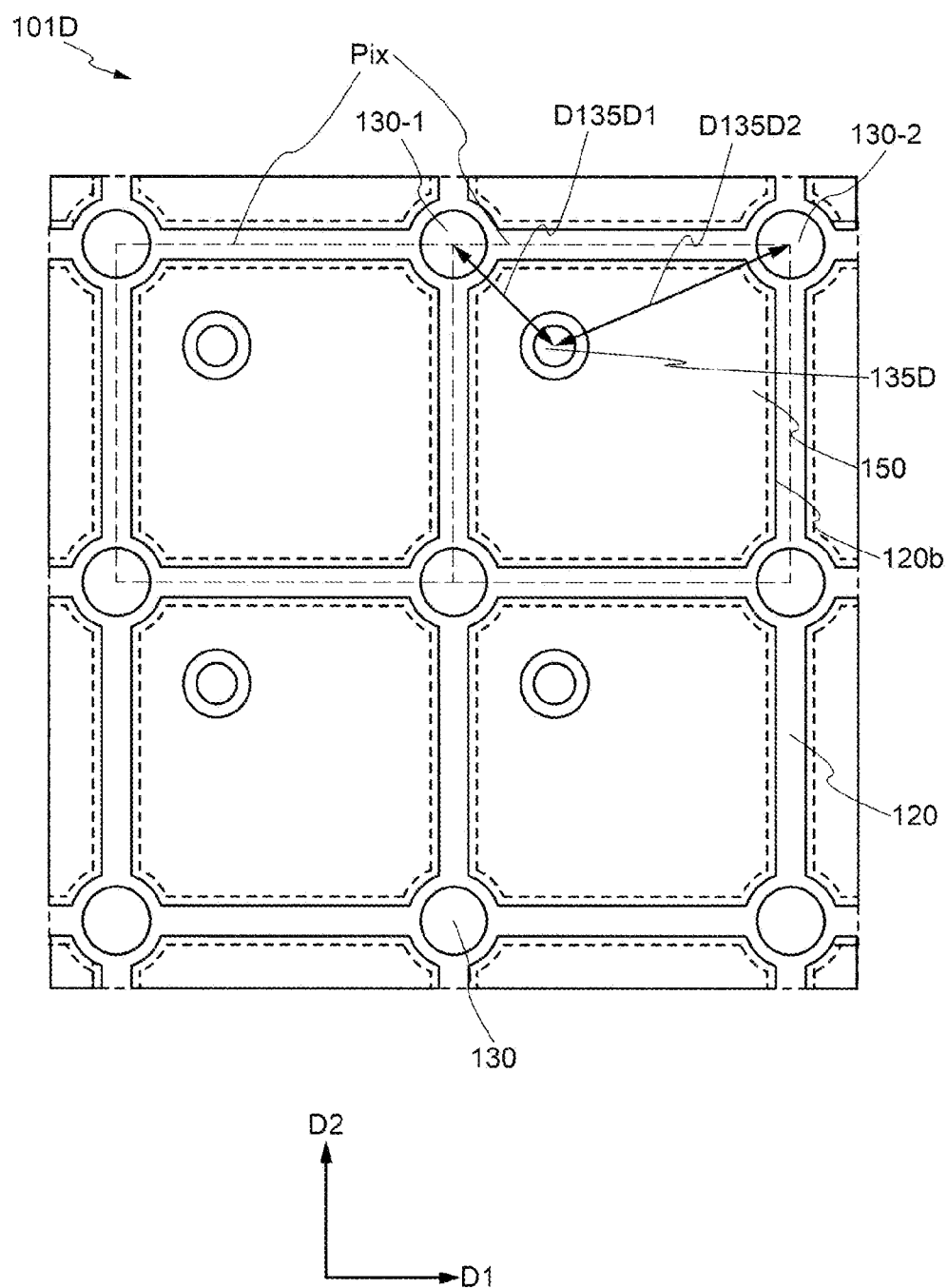
FIG. 17 is a top view showing a part of a display region according to an embodiment of the present invention.

FIG. 17 is a top view showing a part of a display region 101D. As shown in FIG. 17, the display region 101D has the conductive layer 120, the spacer 130, a columnar structure 135D and the pixel electrode 150.

Unlike the columnar structure 135 of the first embodiment, the distance between the spacer 130 and the columnar structure 135D may be different for each spacer. The columnar structure 135D is arranged in the upper left offset from the center in the pixel region Pix. In this case, a distance D135D1 between a spacer 130-1 and the columnar structure 135D is smaller than a distance D135D2 between a spacer 130-2 and the columnar structure 135D. With such a configuration, there is a difference in how the load is applied when pressed, and the pressing amount (pushing amount) required for the electrical connection between the pixel electrode 150 and the counter electrode 180 can be adjusted. In this example, the columnar structure 135 is offset from the center, so that the required pressing amount is increased as compared with the case where the columnar structure 135 is arranged in the center.

Sixth Embodiment

In the present embodiment, an electrooptical device in which a plurality of columnar structures is provided in one pixel will be described.

Figure 18:
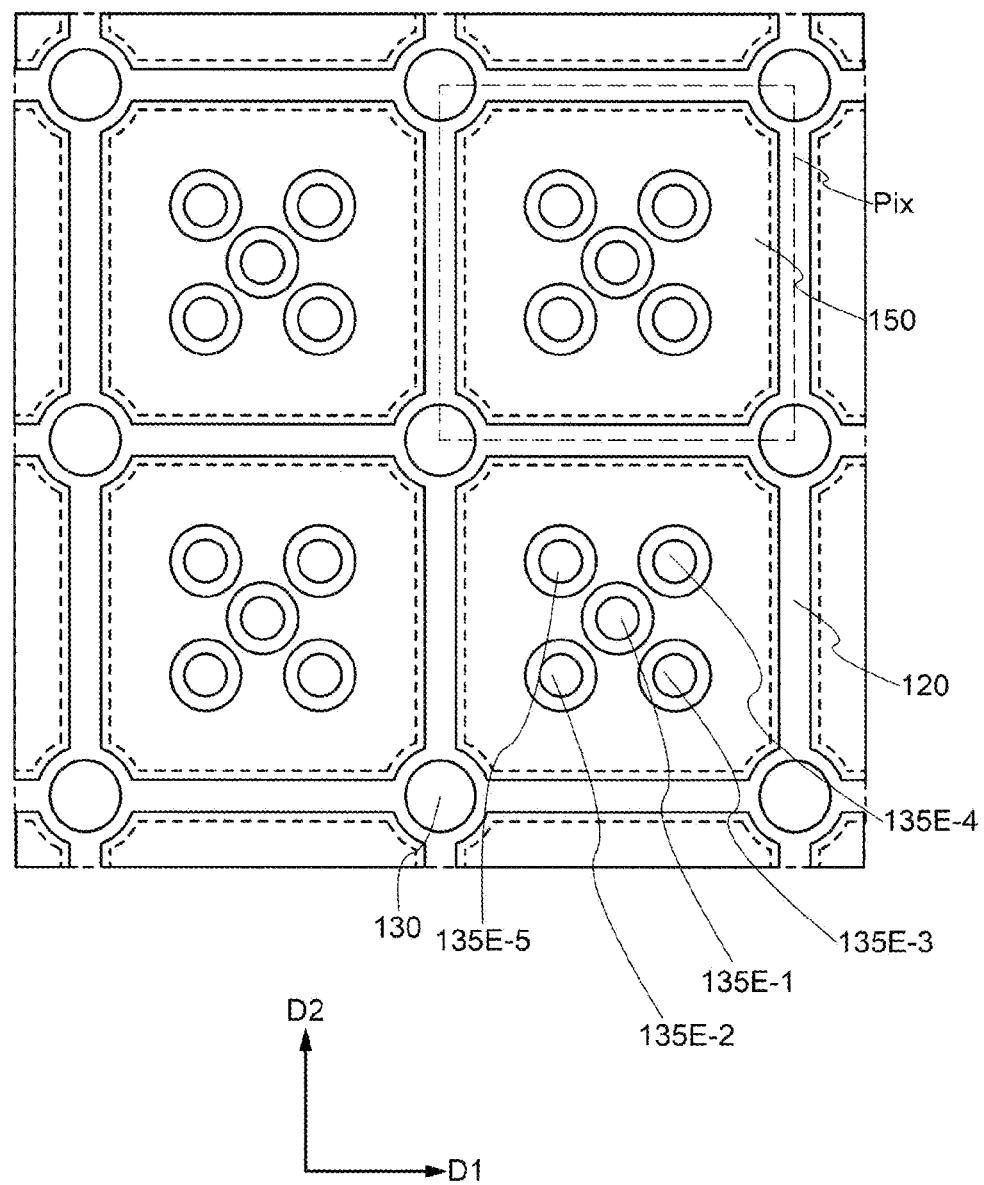
FIG. 18 is a top view showing a part of a display region according to an embodiment of the present invention.

FIG. 18 is a top view showing a part of a display region 101E. As shown in FIG. 18, the display region 101E has the conductive layer 120, the spacer 130, a columnar structure 135E, and the pixel electrode 150.

Unlike the columnar structure 135 of the first embodiment, a plurality of columnar structures 135E is arranged in one pixel region Pix. In this example, a columnar structure 135E-1 is arranged in the center of the pixel region Pix, and columnar structures 135E-2, 135E-3, 135E-4, 135E-5 are arranged in a region between the spacer 130. With such a configuration, it is possible to reduce the connection resistance between the pixel electrode 150 and the counter electrode 180.

In the present embodiment, each of the columnar structures 135E has the same size. However, the invention is not limited thereto. The height of each columnar structure may not be necessarily the same. For example, the columnar structure 135E may be higher as the columnar structure 135E moves away from the center of the pixel area Pix. When the above configuration is provided, when the shape of one columnar structure has collapsed, it is possible to complement the function by using another columnar structure. Therefore, it is possible to provide a high reliable electrooptical device.

Seventh Embodiment

In the present embodiment, an electrooptical device in which the conductive layer 120 and the pixel electrode 150 overlap differently will be described.

Figure 19:
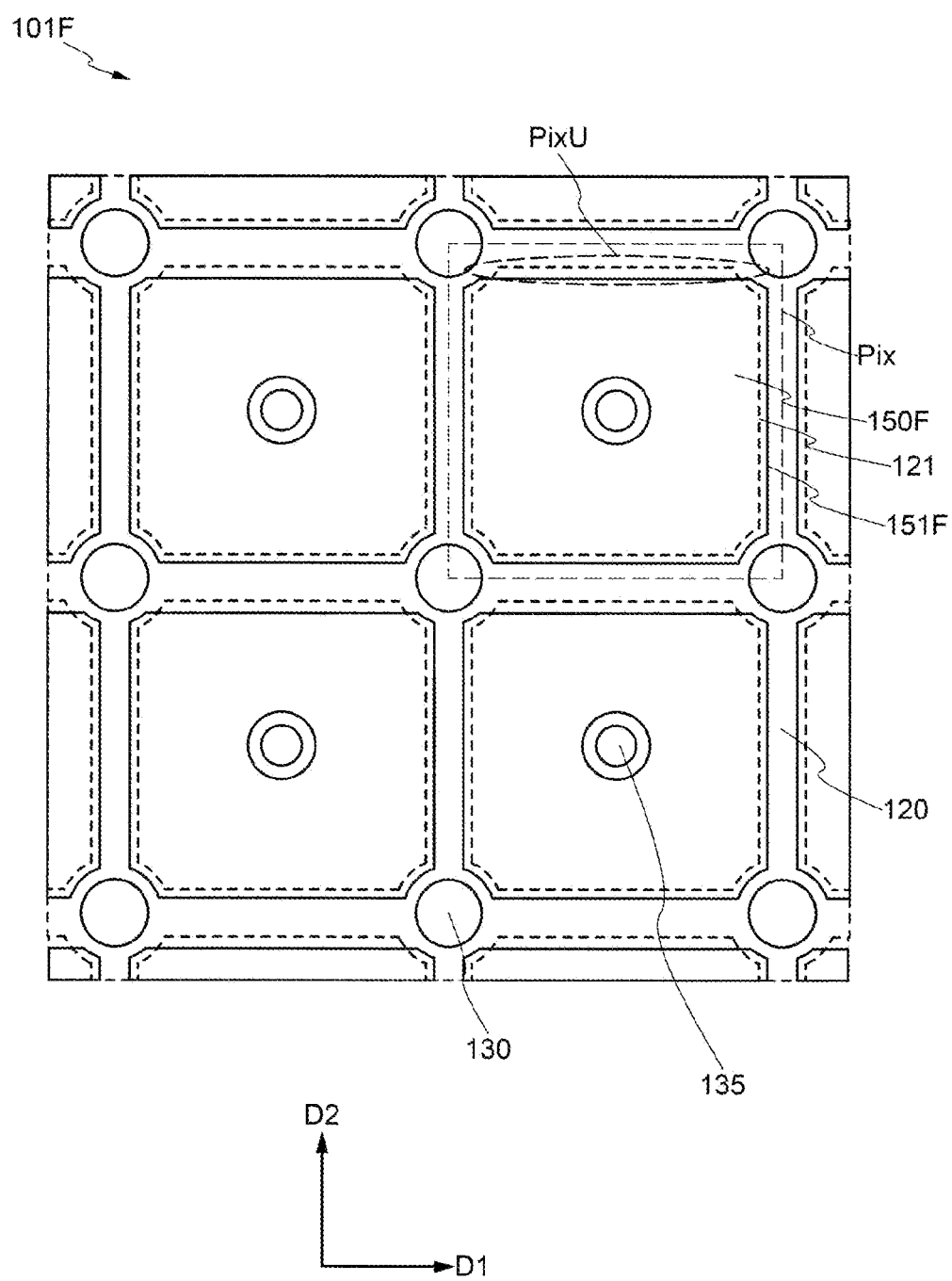
FIG. 19 is a top view showing a part of a display region according to an embodiment of the present invention.

FIG. 19 is a top view showing a part of a display region 101F. As shown in FIG. 19, the display region 101F includes the conductive layer 120, the spacer 130, the columnar structure 135, and a pixel electrode 150F.

In FIG. 19, an end portion 151F of the pixel electrode 150F is shown by a solid line, and the end portion 121 of the conductive layer 120 is shown by a dotted line. Unlike the pixel electrode 150 of the first embodiment, the pixel electrode 150F has a configuration that does not overlap the conductive layer 120 in an upper side PixU of the pixel region Pix. As a result, the influence on the adjacent pixel region Pix can be minimized.

Figure 20:
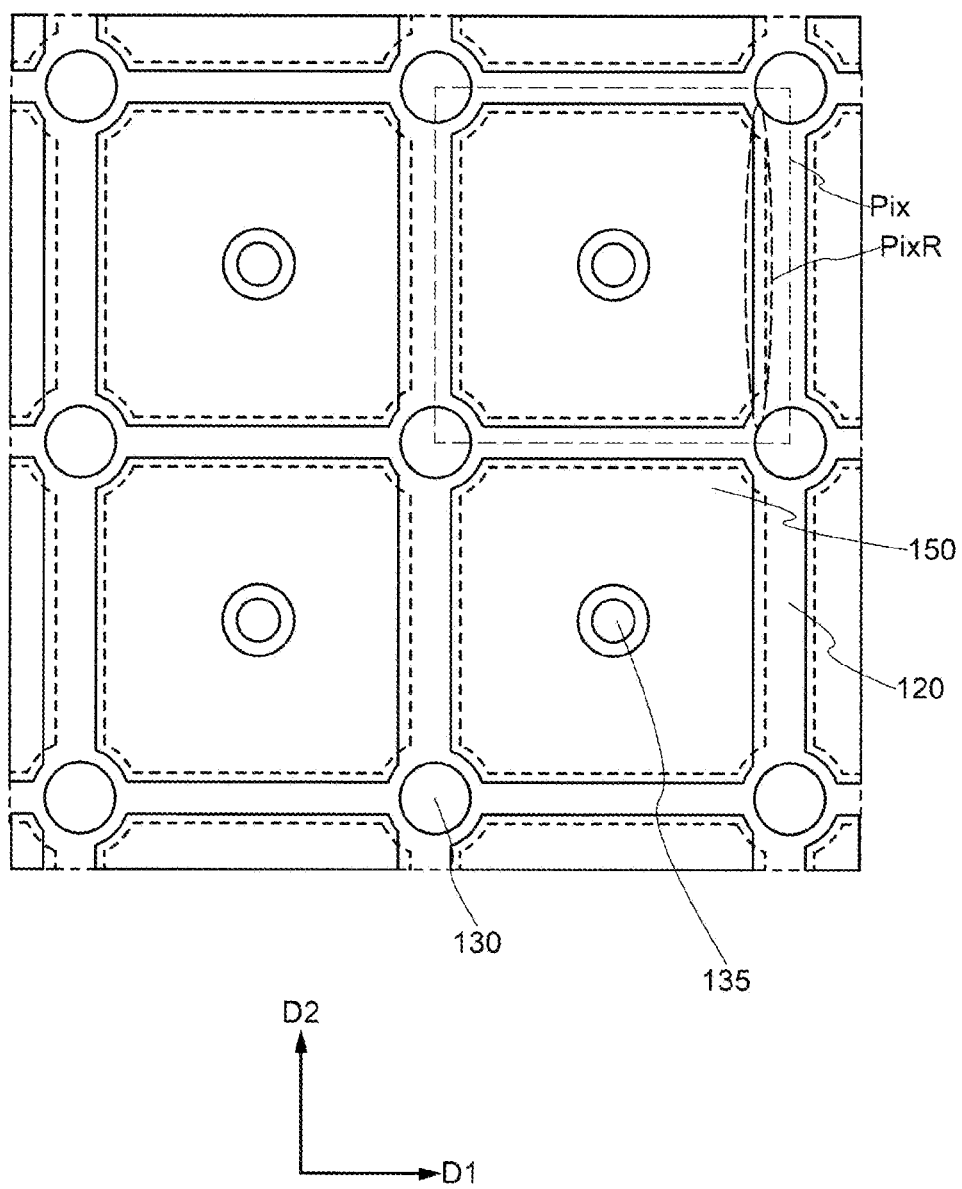
FIG. 20 is a top view showing a part of a display region according to an embodiment of the present invention.

The configuration in which the pixel electrode 150F does not overlap the conductive layer 120 is not limited to the above description. FIG. 20 is a top view showing a part of a display region 101 F1 which is a modification of the display region 101F. As shown in FIG. 20, the pixel electrode 150 may have a configuration that does not overlap with the conductive layer 120 at a right side PixR of the pixel region Pix in the display region 101F1.

Figure 21:
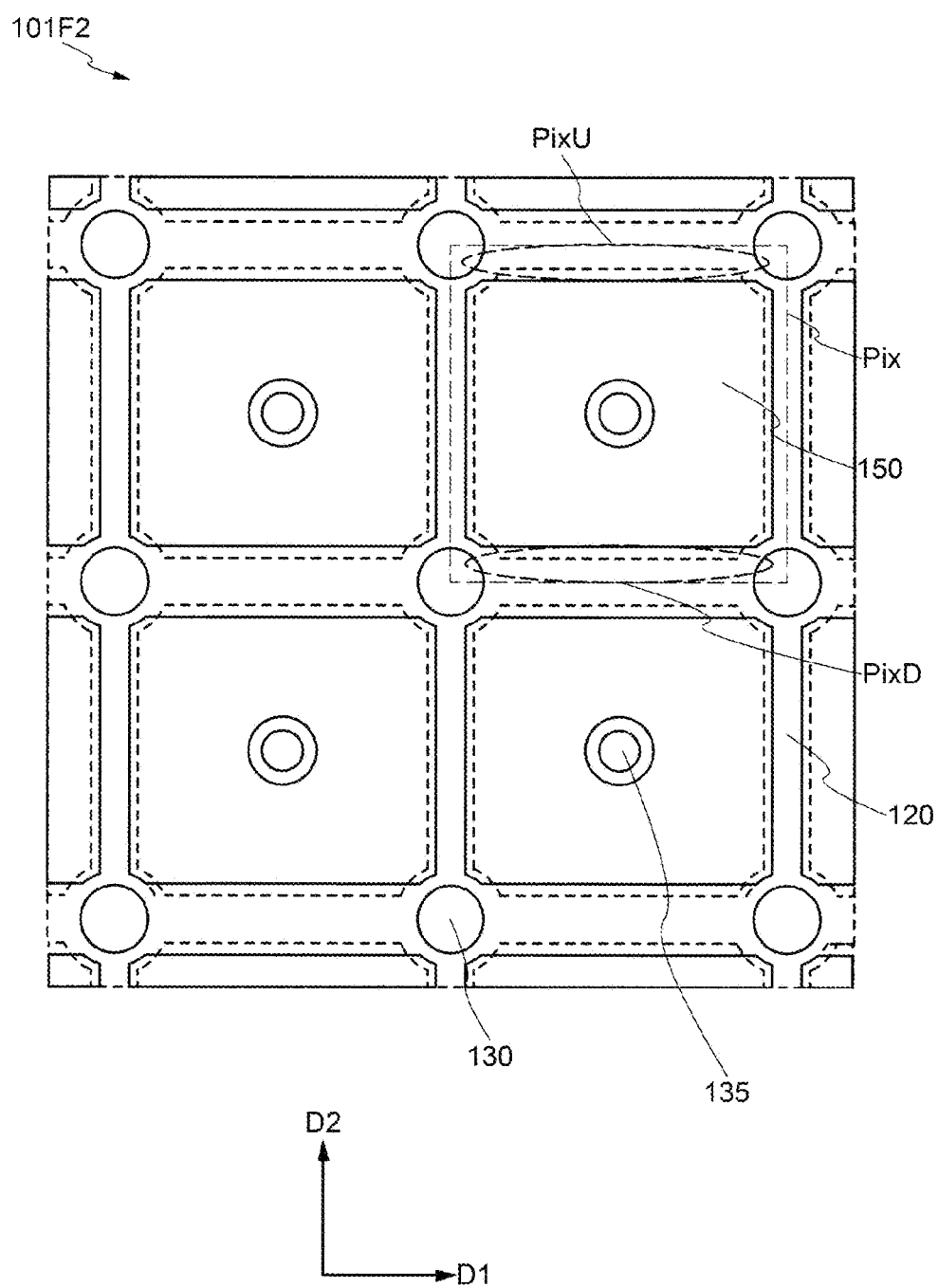
FIG. 21 is a top view showing a part of a display region according to an embodiment of the present invention.

The configuration in which the pixel electrode 150 does not overlap the conductive layer 120 is not limited to one side. FIG. 21 is a top view showing a part of a display region 101 F2 which is a modification of the display region 101F. As shown in FIG. 21, in the display region 101 F2, the pixel electrode 150 may have a configuration that does not overlap the conductive layer 120 in one direction. Specifically, the pixel electrode 150 may have a configuration that does not overlap the conductive layer 120 in the upper side PixU and the bottom side PixD of the pixel region Pix, that is, in the second direction D2. With this configuration, it is possible to reduce the influence of the potential fluctuation on the adjacent pixels in the second direction D2.

Figure 22:
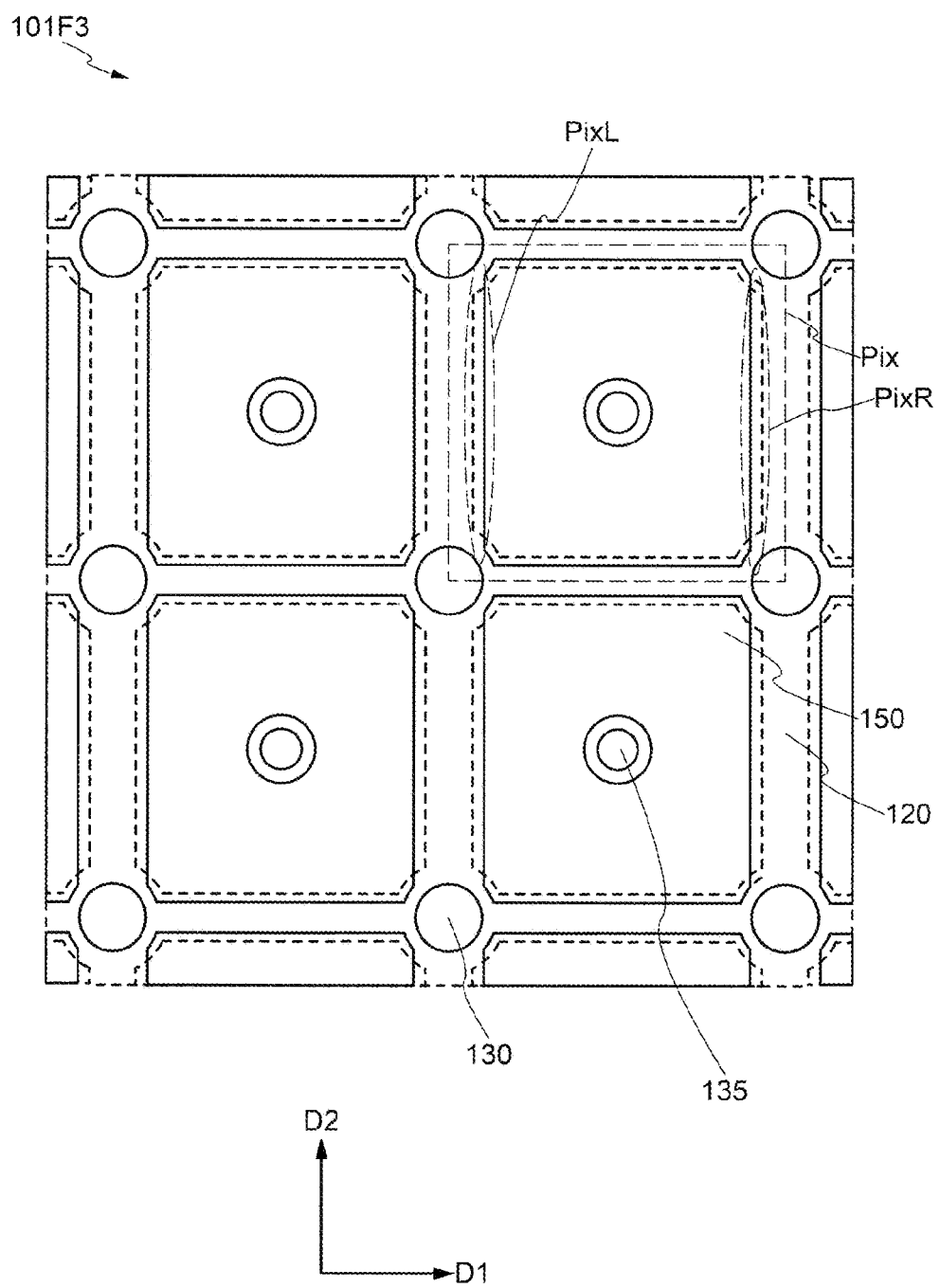
FIG. 22 is a top view showing a part of a display region according to an embodiment of the present invention.

FIG. 22 is a top view showing a part of a display region 101F3 which is a modification of the display region 101F. As shown in FIG. 22, the display region 101 F3 may have a configuration that does not overlap the conductive layer 120 on the left side PixL and the right side PixR of the pixel region Pix, that is, in the first direction D1. With this configuration, it is possible to reduce the influence of the potential fluctuation on the adjacent pixels in the first direction D1.

Figure 23:
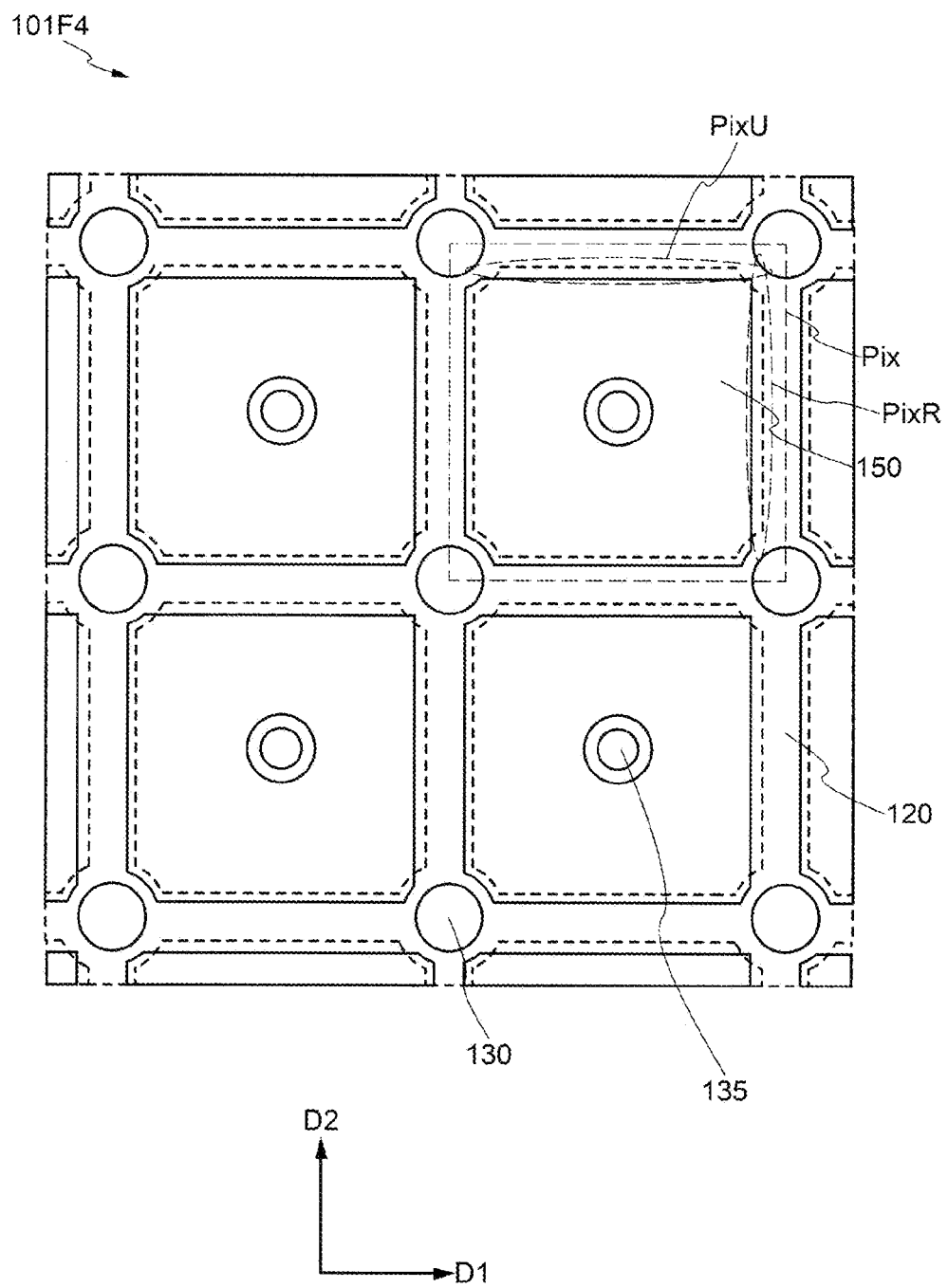
FIG. 23 is a top view showing a part of a display region according to an embodiment of the present invention.

FIG. 23 is a top view showing a part of a display region 101F4 which is a modification of the display region 101F. As shown in FIG. 23, the display region 101 F4 may have a configuration in which the pixel electrode 150 and the conductive layer 120 do not overlap in the region adjacent to the pixel region Pix. Specifically, the pixel electrode 150 may have a configuration that does not overlap the conductive layer 120 on the upper side PixU and the right side PixR of the pixel region Pix. By having this configuration, it is possible to reduce the influence of the potential fluctuation on other pixel regions adjacent to each other on the upper side and the right side of the pixel region Pix.

Figure 24:
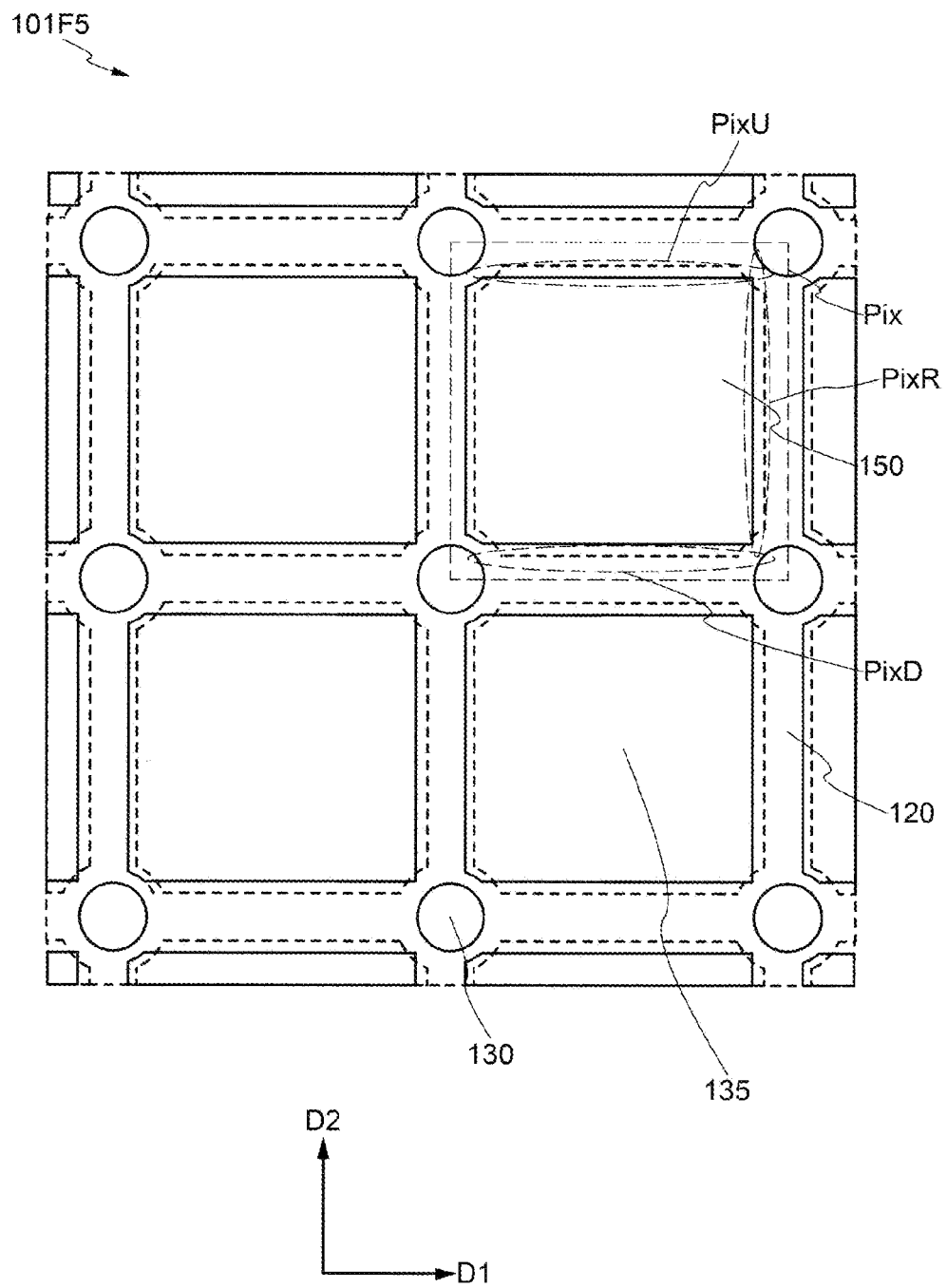
FIG. 24 is a top view showing a part of a display region according to an embodiment of the present invention.

FIG. 24 is a top view showing a part of a display region 101F5 which is a modification of the display region 101F. As shown in FIG. 24, in the display region 101 F5, the pixel electrode 150 may have a configuration that does not overlap the conductive layer 120 on the upper side PixU, the bottom side PixD, and the right side PixR of the pixel region Pix.

Figure 25:
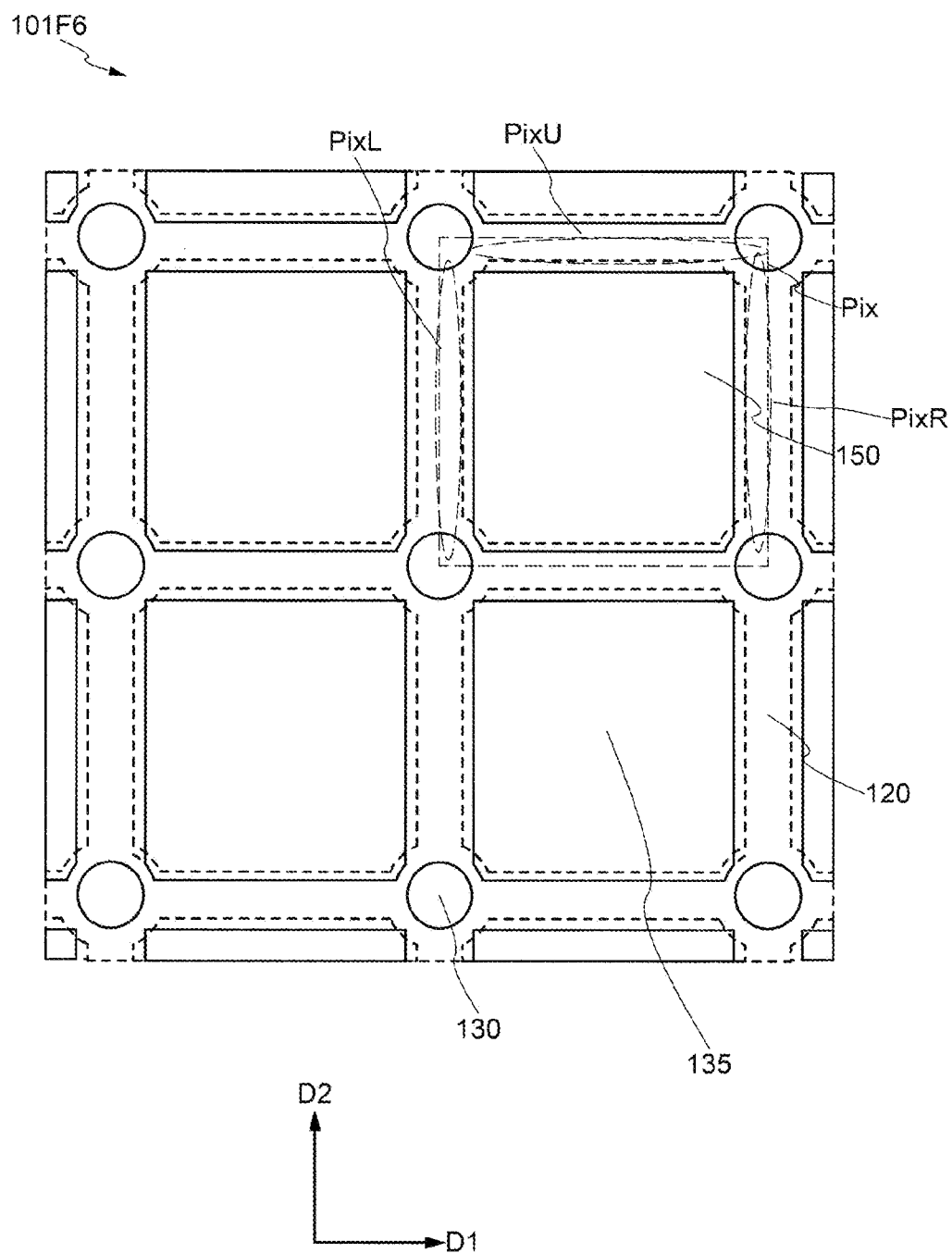
FIG. 25 is a top view showing a part of a display region according to an embodiment of the present invention.

FIG. 25 is a top view showing a part of a display region 101F6 which is a modification of the display region 101F. As shown in FIG. 25, in the display region 101F6, the pixel electrode 150 may have a configuration that does not overlap with the conductive layer 120 on the upper side PixU, the left side PixL, and the right side PixR of the pixel region Pix.

Therefore, by using the present embodiment, the pixel electrode 150 is configured to overlap the conductive layer 120 in at least a part of the periphery of the pixel region Pix (one side). As a result, the influence of the adjacent pixels, specifically, fluctuation of the potential of the adjacent pixel electrodes 150 can be minimized.

Eighth Embodiment

In the first embodiment of the present invention, an example in which the columnar structure is arranged on the first substrate side is shown. However, in the present embodiment, an example in which the columnar structure is arranged on the second substrate side is shown.

Figure 26:
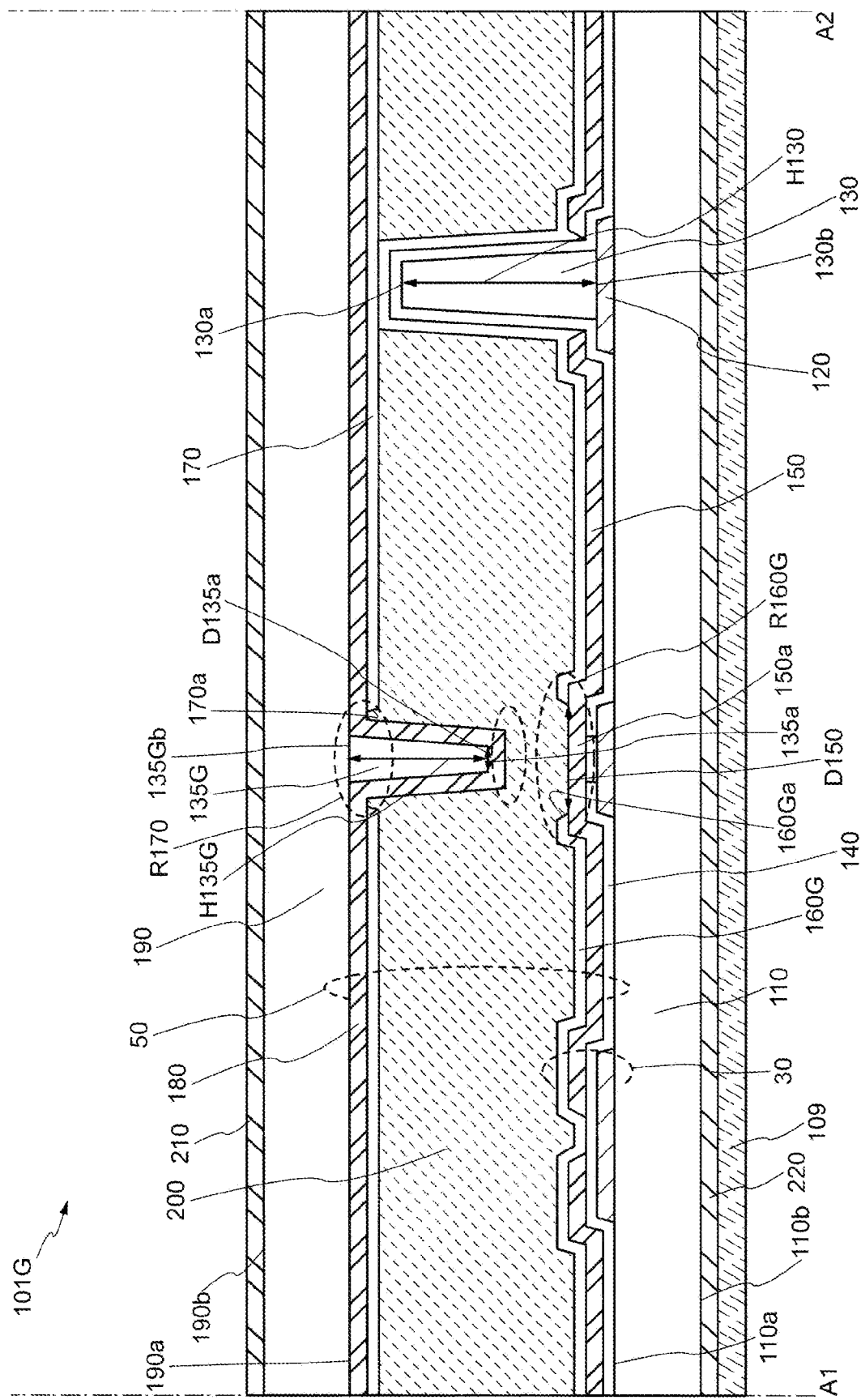
FIG. 26 is a cross-sectional view showing a part of a display region according to an embodiment of the present invention.

FIG. 26 is a cross-sectional view between A1-A2 of a display region 101G. As shown in FIG. 26, the display region 101G includes the conductive layer 120, the spacer 130, a columnar structure 135G, and the pixel electrode 150, the display object 109, the substrate 110, the insulating layer 140, an alignment film 160G, the alignment film 170, the counter electrode 180, the substrate 190, and the liquid crystal layer 200, the polarizer 210, and the polarizer 220. In FIG. 26, unlike the columnar structure 135 of the first embodiment, the columnar structure 135G is arranged on the first surface 190a side of the substrate 190.

The alignment film 160G is provided on the pixel electrode 150. The alignment film 160G has the same function and material as the alignment film 160. The alignment film 160G has an opening 160Ga in a region R160G that overlaps the columnar structure 135G so as not to be arranged on an upper surface 135Ga of the columnar structure. A width D160G of the opening 160Ga is wider than a width D135Ga of the upper surface 135Ga of the columnar structure 135G. Even when the present embodiment is used, the orientation state of the liquid crystal can be switched by the same effects as those of the first embodiment, that is, by being pressed. The columnar structure 135 is not limited to the present embodiment and may be arranged on both the substrate 190 and the substrate 110.

Modification

In the first embodiment of the present invention, an example in which the display region normally changes from the light non-transmission state to the light transmission state by being pressed is shown. However, the present invention is not limited thereto. For example, the display region may change from the normal light transmission state to the light non-transmission state by being pressed.

In the first embodiment of the present invention, an example in which the first direction and the second direction are orthogonal to each other is shown. However, the present invention is not limited thereto. For example, the first direction and the second direction may intersect at 45 degrees, 60 degrees, or 120 degrees. In this case, the pixel region Pix is not limited to a square. The pixel region Pix may have a hexagon or octagon shape. By making the pixel region Pixel a polygon shape, it is possible to achieve a display region having high definition. The pixel region Pix may be a shape other than a polygon.

In the first embodiment, the conductive layer 120 has the function of a light-shielding film. However, the invention is not limited thereto. The function of the light-shielding film may be achieved by other materials. For example, a black resin material may be used for a portion overlapping the spacer 130 and the columnar structure 135.

In the first embodiment of the present invention, a liquid crystal element driven by a TN method is used. However, the present invention is not limited thereto. For example, a light scattering type liquid crystal element may be used. In this case, a polymer dispersed liquid crystal (PDLC) is used as the liquid crystal layer 200. In this case, it is not necessary to arrange the polarizer.

Within the spirit of the present invention, it is understood that various changes and modifications could be made by those skilled in the art and that these changes and modifications also fall within the scope of the present invention. For example, as long as the gist of the present invention is provided, additions, deletions, or changes to the design of components or additions, omissions, or changes to the conditions of processes to each of the above-described embodiments made a person skilled in the art are included in the scope of the present invention.

What is claimed is:

1. An electrooptical device comprising:
   a first substrate;
   a second substrate opposed to the first substrate;
   a plurality of spacers maintaining a distance between the first substrate and the second substrate;
   a pixel electrode provided on the first substrate;
   a conductive layer provided at a first substrate side of the pixel electrode and overlapping a part of the pixel electrode;
   a protrusion provided on the first substrate, protruding toward the second substrate, and covered with the pixel electrode;
   a counter electrode provided on the second substrate and opposed to the pixel electrode;

a first alignment film provided on the pixel electrode and having a first opening in a portion overlapping the protrusion;
a second alignment film provided on the counter electrode and having a second opening in a portion overlapping the protrusion; and
a liquid crystal layer provided between the first alignment film and the second alignment film, wherein
a first distance from a bottom surface to a top surface of the protrusion is smaller than a second distance from a bottom surface to a top surface of the spacer.

2. The electrooptical device according to claim 1, wherein some of the plurality of spacers are arranged at a corner of the pixel electrode.

3. The electrooptical device according to claim 1, wherein the second opening is wider than the top surface of the protrusion.

4. The electrooptical device according to claim 3, wherein when a portion of the second substrate is pressed, the counter electrode is electrically connected to the pixel electrode in a portion opposed to the top surface of the protrusion.

5. The electrooptical device according to claim 1, wherein the conductive layer overlaps a first region of the pixel electrode and a second region separated from the first region, and
the first region and the second region are opposed to each other.

6. The electrooptical device according to claim 1, wherein the pixel electrode has a pair of first edges extending in a first direction and a pair of second edges extending in a second direction intersecting the first direction, and
the conductive layer overlaps one of the pair of first edges and one of the pair of second edges.

7. The electrooptical device according to claim 1 further comprising:
a second conductive layer provided between the protrusion and the first substrate, and having a light-shielding property,
wherein the conductive layer and the second conductive layer are provided at a same layer.

8. The electrooptical device according to claim 1 further comprising:
an insulating layer provided between the pixel electrode and the conductive layer.

9. The electrooptical device according to claim 8, wherein the pixel electrode, the conductive layer, and the insulating layer form a capacitive element,
the pixel electrode is a first capacitive electrode of the capacitive element, and
the conductive layer is a second capacitive electrode of the capacitive element.

10. The electrooptical device according to claim 9, wherein
the insulating layer has an opening in a part of a region overlapping the pixel electrode and the conductive layer.

11. The electrooptical device according to claim 10, wherein
the pixel electrode is provided in one of the first opening and the second opening.

12. The electrooptical device according to claim 10 further comprising:
a semiconductor layer provided in the opening.

13. The electrooptical device according to claim 1 further comprising:
a semiconductor layer provided between the pixel electrode and the conductive layer.

14. The electrooptical device according to claim 13, wherein
the semiconductor layer has a first portion provided in a part of a region overlapping the pixel electrode and the conductive layer and having a first conductivity, and a second portion provided outside the part of the region and having a second conductivity different from the first conductivity.

15. The electrooptical device according to claim 1, wherein
the pixel electrode is in a floating state, and
a voltage is not directly applied to the pixel electrode when the pixel electrode and the counter electrode are not electrically connected.

16. The electrooptical device according to claim 1, wherein
a voltage applied to the conductive layer is lower than a voltage applied to the counter electrode, and a predetermined voltage is applied to the pixel electrode through the conductive layer when the pixel electrode and the counter electrode are not electrically connected.

17. The electrooptical device according to claim 1, further comprising a plurality of protrusions including protrusion, wherein
some of the plurality of protrusions are provided on the pixel electrode.

18. The electrooptical device according to claim 1, wherein
the plurality of spacers includes a first spacer and a second spacer,
the pixel electrode has one side with a first end portion and a second end portion,
the first spacer is adjacent to the first end portion,
the second spacer is adjacent to the second end portion, and
a distance between the protrusion and the first spacer is different from a distance between the protrusion and the second spacer.

* * * * *